(12) United States Patent
Tsuchikawa et al.

(10) Patent No.: US 11,402,973 B2
(45) Date of Patent: Aug. 2, 2022

(54) SINGLE REPRESENTATION OF A GROUP OF APPLICATIONS ON A USER INTERFACE

(71) Applicant: SONY INTERACTIVE ENTERTAINMENT INC., Tokyo (JP)

(72) Inventors: Yuji Tsuchikawa, San Francisco, CA (US); Ryan D. Sutton, San Francisco, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/870,769

(22) Filed: May 8, 2020

(65) Prior Publication Data

US 2021/0349586 A1 Nov. 11, 2021

(51) Int. Cl.
*G06F 3/0484* (2022.01)
*G06F 9/451* (2018.01)
*G06F 3/04817* (2022.01)
*G06F 3/0482* (2013.01)

(52) U.S. Cl.
CPC .......... *G06F 3/0484* (2013.01); *G06F 3/0482* (2013.01); *G06F 3/04817* (2013.01); *G06F 9/451* (2018.02)

(58) Field of Classification Search
CPC .. G06F 3/04817; G06F 3/0482; G06F 3/0484; G06F 9/451
See application file for complete search history.

(56) References Cited

U.S. PATENT DOCUMENTS 5,497,455 A 3/1996 Suga et al.
6,101,506 A * 8/2000 Ukai ............... G06F 3/0482
707/679

(Continued)

FOREIGN PATENT DOCUMENTS

EP 2713260 A1 4/2014
WO 2014130321 A2 8/2014
WO 2015066658 A1 5/2015

OTHER PUBLICATIONS

PCT/US2021/030336, "International Search Report and the Written Opinion", dated Aug. 11, 2021, 15 pages.

(Continued)

*Primary Examiner* — Eric J. Bycer
(74) *Attorney, Agent, or Firm* — Kilpatrick Townsend & Stockton LLP

(57) ABSTRACT

Techniques are described for presenting application variations on a user interface. In an example, the techniques include associating computer applications with an application group, the computer applications being different variations of a same computer program. The techniques further include generating a user interface (UI) element that represents the application group. The techniques further include selecting a first computer application of the computer applications to indicate in association with the UI element. The techniques further include presenting the UI element on a user interface, the UI element indicating the application group and the first computer application, the UI element configured to, upon selection via the user interface, launch the first computer application or launch a page about the application group.

20 Claims, 12 Drawing Sheets

(56) References Cited

U.S. PATENT DOCUMENTS

| | | | |
|---|---|---|---|
| 7,770,125 B1* | 8/2010 | Young | G06F 9/451 715/764 |
| D761,842 S | 7/2016 | Johnson et al. | |
| 9,519,471 B2 | 12/2016 | Machalani et al. | |
| 9,640,138 B2 | 5/2017 | Yasuda et al. | |
| 11,003,312 B2 | 5/2021 | Sakaino et al. | |
| 11,169,665 B2 | 11/2021 | Hunter et al. | |
| 2003/0181242 A1* | 9/2003 | Lee | A63F 13/12 463/42 |
| 2006/0218499 A1 | 9/2006 | Matthews et al. | |
| 2007/0067798 A1* | 3/2007 | Wroblewski | H04N 21/47 725/38 |
| 2007/0112852 A1* | 5/2007 | Sorvari | G06F 16/168 |
| 2009/0019398 A1* | 1/2009 | Hansson | G06F 16/58 707/E17.026 |
| 2010/0313156 A1 | 12/2010 | Louch et al. | |
| 2011/0032250 A1* | 2/2011 | Tanaka | A63F 13/77 345/418 |
| 2011/0252361 A1 | 10/2011 | Tsuda et al. | |
| 2012/0204131 A1 | 8/2012 | Hoang et al. | |
| 2012/0284673 A1 | 11/2012 | Lamb et al. | |
| 2013/0036380 A1* | 2/2013 | Symons | G06F 3/04817 715/804 |
| 2013/0038637 A1 | 2/2013 | Yamanaka et al. | |
| 2013/0055162 A1 | 2/2013 | Arriola et al. | |
| 2013/0067393 A1 | 3/2013 | Demopoulos et al. | |
| 2013/0290886 A1 | 10/2013 | Chen et al. | |
| 2014/0096083 A1* | 4/2014 | Kim | G06F 3/04842 715/835 |
| 2015/0128042 A1* | 5/2015 | Churchill | H04N 21/4438 715/718 |
| 2015/0169699 A1 | 6/2015 | Gilbert et al. | |
| 2015/0189390 A1* | 7/2015 | Sirpal | H04N 21/44213 725/51 |
| 2015/0222700 A1* | 8/2015 | Kay | G06Q 30/06 715/835 |
| 2015/0370456 A1 | 12/2015 | Kobayashi et al. | |
| 2016/0041719 A1 | 2/2016 | Wang et al. | |
| 2016/0209993 A1* | 7/2016 | Singal | G06F 3/0486 |
| 2016/0224211 A1 | 8/2016 | Xu et al. | |
| 2017/0060388 A1 | 3/2017 | Einaudi | |
| 2017/0091336 A1 | 3/2017 | Royzner et al. | |
| 2019/0370282 A1* | 12/2019 | Vergnaud | G06F 16/483 |
| 2020/0081592 A1 | 3/2020 | Lin et al. | |

OTHER PUBLICATIONS

PCT/US2021/030339, "International Search Report and Written Opinion", dated Aug. 4, 2021, 11 pages.

PCT/US2021/030333, "International Search Report and Written Opinion", dated Aug. 4, 2021, 11 pages.

* cited by examiner

SINGLE REPRESENTATION OF A GROUP OF APPLICATIONS ON A USER INTERFACE

BACKGROUND OF THE INVENTION

Graphical user interfaces (GUIs) are the predominant type of interfaces available to users for interacting with computer systems. A GUI includes selectable icons to launch applications on a computer system. Typically, to launch a specific application, a user of the GUI identifies the application in a file browser or menu application and affirmatively selects the application before launching it. In certain situations, the computer system stores multiple variations of a same computer application. In these situation and although only one of the variations may be of interest, the GUI can present each variation as a separate selectable icon. The selection process includes reviewing the different icons to then determine the particular icon of the variation of interest.

To illustrate, consider an example of a GUI of a video game system hosting two video game application variations and multiple files each associated with episodic audiovisual content. The GUI presents a home page that includes a number of video game icons and a number of media content icons. From this home page, a video game player selects a video game icon to launch a video game application variation. The video game application variation that is launched by the video game system corresponds to the video game icon selected. Similarly, selecting a media content icon will launch the corresponding episodic audiovisual content. Such specificity involves identifying, by the user of the video game system, the correct video game icon and the correct media content icon corresponding to the desired video game application variation and episodic audiovisual content.

Hence, although a GUI can be an effective user interface, selecting applications and content may not be seamless and the presentation of information may be unintuitive, requiring multiple steps to confirm the correct selection or repeated reselection. There is a need for an improved GUI that allows streamlined selection of applications of greatest interest to the user.

BRIEF SUMMARY OF THE INVENTION

Embodiments of the present disclosure relate to techniques for better information sharing and control switching in a graphical user interface (GUI). In an example, a method for presenting application variations on a user interface is implemented on a computer device. The method includes associating computer applications with an application group. The computer applications are different variations of a same computer program. The method also includes generating a user interface (UI) element that represents the application group, selecting a first computer application of the computer applications to indicate in association with the UI element, and presenting the UI element on a user interface, the UI element indicating the application group and the first computer application. The UI element is configured to, upon selection via the user interface, launch the first computer application or launch a page about the application group.

In an example, the first computer application is selected based on a first set of selection factors and prior to a user interaction on the computer device with a second computer application of the computer applications. In this example, the method also includes receiving the user interaction, selecting, after the user interaction, the second computer application based on a second set of selection factors, and updating a presentation of the UI element to the second computer application instead of the first computer application. Further, the first set of selection factors is different from the second set of selection factors, and wherein the second set of selection factors relates to the user interaction. Or, the first set of factors includes at least one of: a first priority of an executable variation of the computer program in association with a user identifier over a non-executable variation of the computer program in association with the user identifier, a second priority of a backward compatible variation of the computer program over a non-backward compatible variation of the computer program, a third priority of an installed variation of the computer program over a non-installed variation of the computer program, a fourth priority of a compatible variation of the computer program with a computer device generation over another compatible variation of the computer program with a previous computer device generation, a fifth priority of a full version of the computer program over a beta version of the computer program and over a demo version of the computer program, or a sixth priority of a regional variation of the computer program for a region associated with the user identifier over another variation of the computer program for a different region.

In an example, the UI element includes a sortable attribute about the first computer application and a package attribute about at least one of: a release version of the first computer application or a compatible version of the computer device to run the first computer application. In this example, the sortable attribute includes at least one of: a last execution date of the first computer application on the computer device, an availability date of when the first computer application became available on the computer device to a user identifier, or a length of time the first computer application was executed in association with the user identifier.

In an example, the computer program is a video game title. The computer applications are video game variations. The UI element is presented as an icon in a library that shows multiple icons corresponding to multiple video game titles. In this example, the icon includes content that represents the video game title. The icon further includes an indicator that identifies at least one of: a variation of the first computer application, an access status of a user of the computer device for the first computer application, a storage status of the first computer application on the computer device, a download status of the first computer application, or a sortable attribute of the first computer application.

In an example, the UI element includes content that represents the application group. The UI element further includes an indicator that identifies the first computer application. The content is included in the UI element independently of the selecting of the first computer application. The indicator is included in the UI element dependently on the selecting of the first computer application and changes with a selection of a second computer application of the computer applications.

In an example, the UI element is presented in a presentation state that is one of at least: a non-focused presentation state or a focused presentation state. The UI element includes data about the first computer application upon presentation in the non-focused presentation state. The UI element includes the data and additional data about the first computer application upon presentation in the focused presentation state. In this example, the UI element further includes content that remains the same in the non-focused presentation state and in the focused presentation state. The method also includes storing associations between indicators of the first computer application and the presentation state. The associations change between the non-focused presentation state and the focused presentation state. The data includes one of the indicators and the additional data includes a different one of the indicators.

In an example, the UI element is generated based on computer programs available on the computer device and on a user identifier of a user of the computer device.

In an example, a computer device implements the above method. The computer device includes one or more processors, and one or more memories storing computer-readable instructions that, upon execution by the one or more processors, configure the computer device to perform operations of the above method.

In an example, a non-transitory computer-readable storage medium stores computer-readable instructions that, upon execution on a computer device, cause the computer device to perform operations. The operations correspond to the above method.

DETAILED DESCRIPTION OF THE INVENTION

Figure 1:
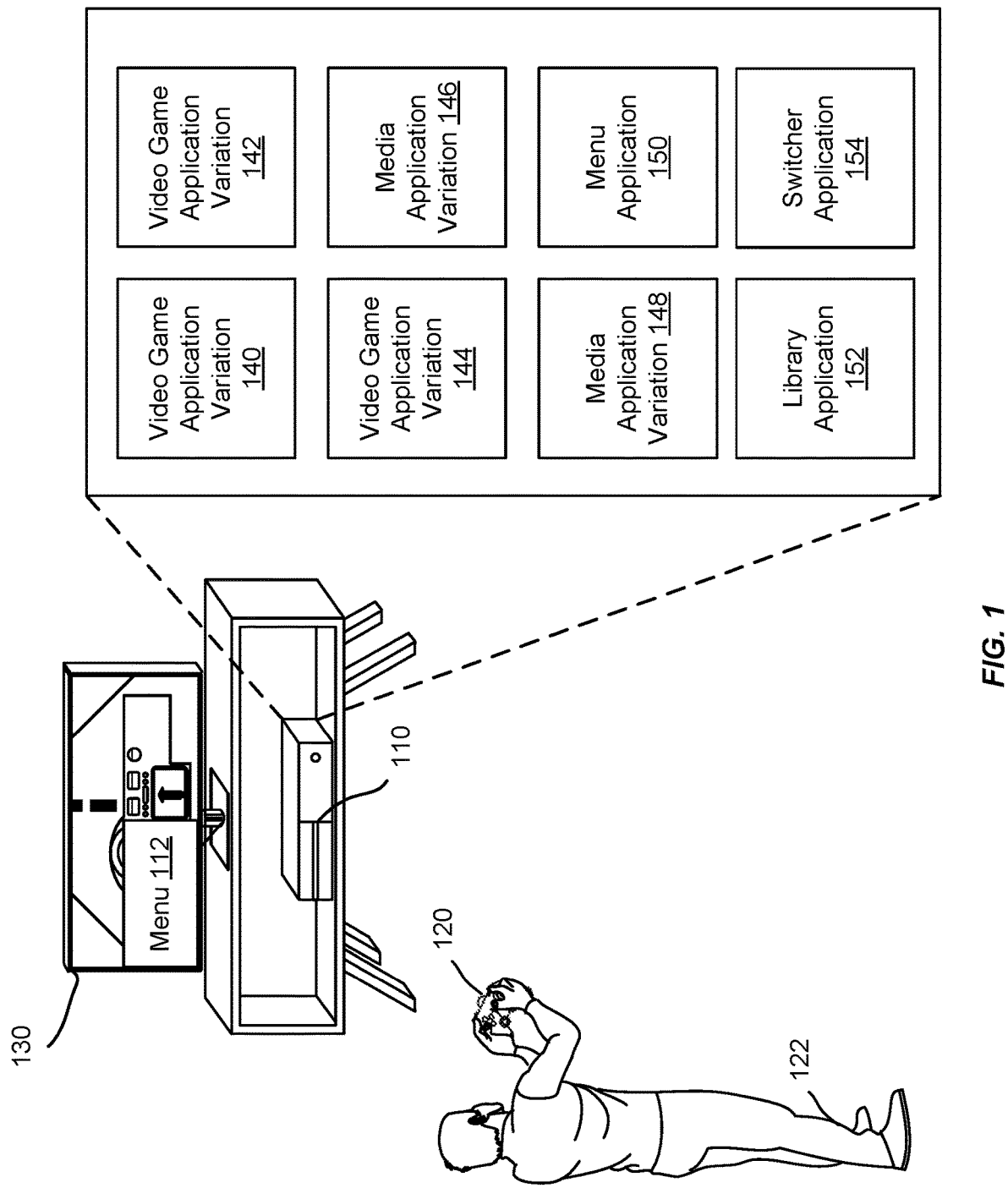
FIG. 1 illustrates a computer system that presents a menu, according to an embodiment of the present disclosure.

Generally, systems and methods for improved information sharing and navigation in a graphical user interface (GUI) are described. In an example, a computer system stores, for each application, one or more variations of the application (application variation(s)). The computer system associates the variation(s) of each application with a corresponding application group and presents information about the application groups in a GUI on a display. In particular, each application group can be shown with a single UI element in a menu on the GUI. In other words, the menu presents a plurality of UI elements and each one of the UI elements corresponds to one of the application groups. For each application group, the computer system selects one of the application variations of the application group as potentially being the most relevant application variation to a user of the computer system. The selection can be based on one of two sets of selections factors. The first set of selection factors is applied before user interaction with the application group, while the second set of selection factors applies in response to a user interaction with an application variation of the application group. A UI element corresponding to an application group presents content that may be common to the application variations of the application group and indicates the most relevant application variation. Further, the UI element is linked to the most relevant application variation or to a page that presents information about the application group. Upon a user selection of a UI element, the computer system launches the linked application variation or page.

To illustrate, consider an example of a video game system. The video game system can host a menu application and a number of variations per video game application. A variation of a video game application can be any of a demo version, a trial version, a full release version, a variation of any these versions with a particular set of game levels, a variation of any these versions compatible with a generation of the video game system, or a variation of these versions specific to a geographical region. The menu application can associate each of the variations of the same video game application with a game application group. A video game player can login to the video game system. The menu application can determine that, for a first game application group corresponding to a car racing video game application, the demo version of the car racing video game could potentially be most relevant to the video game player. Similarly, the menu application can determine that, for a second game application group corresponding to a football video game application, a full release version with a particular regional variation potentially to be most relevant to the video game player. Upon a user button push on a video game controller, a menu can be presented and can include different tiles. Each tile represents a UI element that corresponds to one of the game application groups. As such, the tiles include a first tile corresponding to the first game application group and a second tile corresponding to the second game application group. The first tile presents content common to the variations of the car racing video game application (e.g., a poster image showing a racing car), indicates the demo version (e.g., with a text "demo" included in the tile), and is linked to the demo version. Similarly, the second tile presents content common to the variations of the football video game application (e.g., a poster image showing a football team), indicates the full release version with the regional variation (e.g., with a text "full release U.S.A." included in the tile), and is linked to a page about the football video game application. In response to a user interaction (e.g., a button press) with the first tile, the video game system launches the demo version of the car racing video game application. Upon a user interaction with the second tile, the page is launched. This page shows the full release version with the regional variation and other variations of the football video game application including, for instance, a trial version with another regional variation (e.g., a variation for Japan). Subsequent to a user interaction with the trial version, and upon return to the menu, the second tile is updated to indicate the trial version while still showing the same content (e.g., the football team poster image is shown, but the text is updated to "trial version Japan"). The update also links the second tile to the trial version. Hence, upon a user selection of the updated second tile, the trial version with the regional variation is launched.

Embodiments of the present disclosure provide several advantages over existing GUIs and their underlying computer systems. For example, by associating multiple variations of a same application with an application group and presenting each application group with a single UI element in a menu on a GUI, the menu becomes more navigable relative to existing menus that would present an icon per variation instead. In particular, the menu is decluttered and additional menu space becomes available to present UI elements that otherwise would have necessitated presentation in different tabs and/or scrollable sections of the menu. Further, the menu is intuitive because each of the UI elements can be linked to the application variation that is likely most relevant to a user of the menu and the relevant is updated dynamically based on user interactions. Such improvements to the navigability and intuitiveness of the menu reduce system computational demands arising from the need to otherwise navigate large menus with a large number of icons, and improve user experience by reducing frustration and fatigue caused by inefficient menu navigation.

In the interest of clarity of explanation, the embodiments may be described in connection with a video game system including a video game console. However, the embodiments are not limited as such and similarly apply to any other type of a computer system. Generally, a computer system presents a menu in a GUI on a display. The menu presents UI elements, each corresponding to an application group. Each application group corresponds to an association between one or more variations of a same computer application included in (e.g., as program code) or available to the computer system. The computer system selects one of the variations of the same computer application and links it to the UI element corresponding to the application group. A user interaction with a given UI element would launch the respective selected variation directly (e.g., without user selection from amongst variations of the same computer application) and/or present a page that provides more information about the application group and the variations.

FIG. 1 illustrates a computer system that presents a menu, according to an embodiment of the present disclosure. As illustrated, the computer system includes a video game console 110, a video game controller 120, and a display 130. Although not shown, the computer system may also include a backend system, such as a set of cloud servers, that is communicatively coupled with the video game console 110. The video game console 110 is communicatively coupled with the video game controller 120 (e.g., over a wireless network) and with the display 130 (e.g., over a communications bus). A video game player 122 operates the video game controller 120 to interact with the video game console 110. These interactions may include playing a video game presented on the display 130, interacting with a menu 112 presented on the display 130, and interacting with other applications of the video game console 110 (e.g., with media applications to stream media from an online content source or to play a media file from the local storage of the video game console 110).

The video game console 110 includes a processor and a memory (e.g., a non-transitory computer-readable storage medium) storing computer-readable instructions that can be executed by the processor and that, upon execution by the processor, cause the video game console 110 to perform operations related to various applications. In particular, the computer-readable instructions can correspond to program codes for the various applications of the video game console 110 including variations 140, 142, and 144 of a video game application and variations 146 and 148 of a media application. Of course, there may be more than one video game application and more than one media application. A video game application generally represents a computer application executable to present video game content, receive user interaction with the video game content, and accordingly update the video game content. A media application generally represents a computer application executable to present media content including audio, video, and/or other media types, receive user interaction with the media content, and accordingly update the media content. The media content can be streamed from a remote content source or can be presented form local storage of the video game console 110. Further, other applications can be likewise included in the video game console 110, such as a social media application, a chat application, and the like. The availability of a video game application, media application, and/or other type of computer application to the video game player 122 via the video game console 110 can depend on a user identifier of the video game player 122 (e.g., upon a login to the video game console 110, the availability of the computer applications can depend on the user identifier used in the login). In addition, the video game console 110 includes a menu application 150, a library application 152, a switcher application 154. The menu application 150 can present a home user interface (UI) in a GUI of the display 130. The library application 152 can present a library of UI elements in a library menu on the GUI. And the switcher application 154 can present a ribbon of UI elements in a ribbon menu on the GUI to allow the scrolling between different UI elements and the switching between corresponding application variations.

The video game controller 120 is an example of an input device. Other types of the input device are possible including, a keyboard, a touchscreen, a touchpad, a mouse, an optical system, or other user devices suitable for receiving input of a user.

Upon an execution of the video game application variation 140 by the video game console 110, a rendering process of the video game console 110 presents video game content (e.g., illustrated as a car race video game content) on the display 130. Upon user input from the video game controller 120 (e.g., a user push of a particular key or button), the rendering process also presents the menu 112. Depending on the user input, the menu 112 corresponds to the home UI menu, the library menu, or the ribbon menu. The menu 112 can be presented in a layer over the video game content.

Upon the presentation of the menu 112, the user control changes from the video game application variation 140 to an underlying application (e.g., the menu application 150, the library application 152, or the switcher application 154 as applicable). Upon a receiving user input from the video game controller 120 requesting interactions with the menu 112, the underlying application supports such interactions by updating the menu 112 and launching any relevant application in the background or foreground. The video game player 122 can exit the menu 112 or automatically dismiss the menu 112 upon the background or foreground launch. Upon the exiting of the menu 112 or the dismissal based on a background application launch, the user control changes from the underlying application to the video game application 140. If a foreground ground application is launched, the user control changes from the underlying application to this application instead. In both cases, further user input that is received from the video game controller 120 is used for controlling the relevant application and/or for requesting the menu 112 again.

As described in more detail in reference to FIGS. 2-3, below, the library application 152, when executed, may determine a concept corresponding to the variations 140, 142, and 144 of the video game application, a concept corresponding to the variations 146 and 148 of the media application, and other concepts corresponding to the other application variations, and generate a menu (e.g., a "library menu" including a "game library menu" for concepts related to video game applications and a "media library menu" for concepts related to media applications) configured to present the concepts as interactive and/or dynamic tiles. The term "concept" is used herein to refer to an application group of different variations of a same computer application. The term "tile" is used herein as an example of an interactive UI element generated and/or presented by the library application 152 and corresponding to a single concept. Other implementations to present a UI element are possible, including any type of icon, whether a tile, a thumbnail, a text description, a multiple column element with textual or graphical description in each column, and the like. As described further, below, tiles may be presented in several presentation states associated with differing levels of application information and/or dynamic content presented with the tile in the media library. Although the following description focuses on the library application 152 presenting tiles representing video game applications, the library application 152 may similarly generate and/or present tiles associated with media applications, other types of computer applications, and/or computer files (e.g., content files such as photos, video, animations, multimedia, and the like).

As described in more detail in reference to FIG. 4, below, the library application 152 may be executed via multiple avenues of ingress. For example, the library application 152 may be executed by a pre-defined user interaction (e.g., via controller 120, a voice command from the video game player 122, etc.) and/or by navigating one or more menus and/or sub-menus of the video game console 110 (e.g., menu 112). In some embodiments, the switcher application 154 generates and/or presents a tile associated with the library application 152, that causes the video game console 110 to execute the library application 152 when the video game player 122 interacts with the respective tile. The switcher application 154 is described in greater detail in reference to FIG. 4, below.

Although FIG. 1 illustrates that the different applications are executed on the video game console 110, the embodiments of the present disclosure are not limited as such. Instead, the applications can be executed on the backend system (e.g., the cloud servers) and/or their execution can be distributed between the video game console 110 and the backend system.

Figure 2:
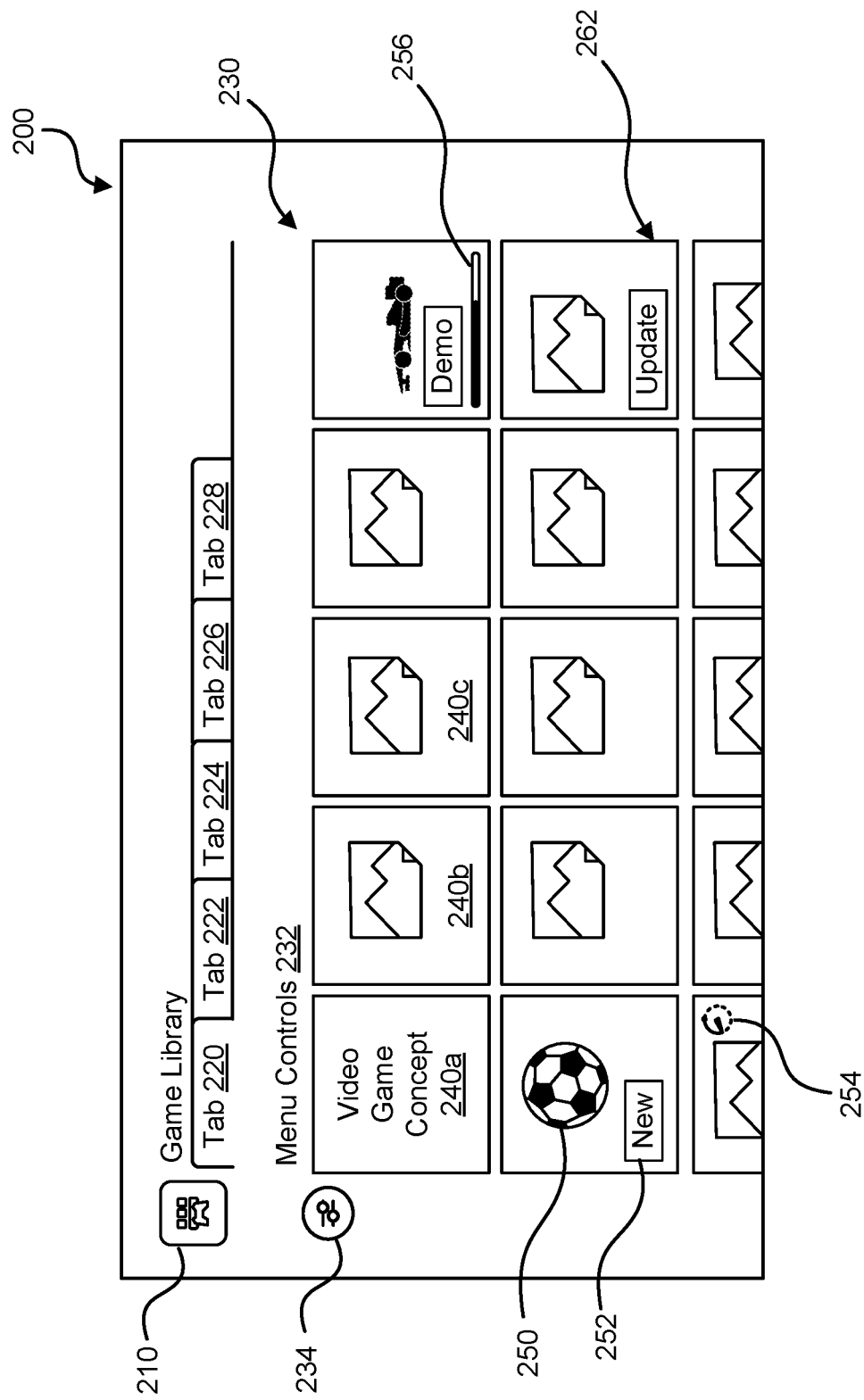
FIG. 2 illustrates an example of a library with selectable tiles in a glanced state, according to an embodiment of the present disclosure.

FIG. 2 illustrates an example of a library 200 with selectable tiles in a glanced state 262, according to an embodiment of the present disclosure. As shown in FIG. 2, the library 200 organizes multiple UI elements permitting navigation and interaction with different computer video game applications available via a video game console (e.g., the video game console 110 of FIG. 1). In some embodiments, the library 200 includes one or more top-level UI elements, including an icon 210 and one or more tabs 220-228. The icon 210 may be an interactive and/or dynamic UI control element that is configured to receive user input and to execute one or more actions depending on the type of input received. For example, the icon 210 may be presented in the library as a static badge or icon representing a stylized arrangement of tiles, where the icon 210 may act as a home control to leave the library 200 (e.g., exit, minimize, hide the library UI, etc.). The one or more tabs 220-228 may be linked and/or associated to different content and/or application types available via the video game console. For example, the tab 220 as illustrated in FIG. 2 corresponds to a menu that includes tiles for video game applications. The tab 220 may be associated and/or linked to a particular category of video game applications, such as video game applications that are associated with a "collection" category specific to a user account. The collection may include, but is not limited to, user-obtained video game applications (e.g., ordered, downloaded, installed from a content network or an online game content platform), previously played video game applications, and other video game applications that a user with access to the user account has interacted with.

In another example, the tabs 220-228 may be associated with different categories of video game applications. For example, the tab 222 may be associated and/or linked to "installed" video game applications that are installed on the video game console or on an external memory in communication with the video console. In some embodiments, installed content (e.g., an installed video game application) may be available without access control, such that any user of the video game console may launch or otherwise access the installed content. Alternatively, the library 200 may be user specific, such that access to applications and content may be limited based on privileges specific to the user account. The tab 224 may be associated and/or linked to "shared" video game applications for which access has been granted by the user account to other user accounts. As an illustrative example, a video game application may have been obtained by a different user and, rather than being entirely installed locally on the video game console, stored or otherwise provided at least partly by an online content distribution network (e.g., elements of the video game application may be installed locally while elements are stored or provided by the network). The tab 226 may be associated and/or linked to a membership program that provides privileged access to video game applications for the specific user account. In another example, the tab 228 may be associated and/or linked to a streaming platform for users of the video game console.

As further illustrated in FIG. 2, the library 200 presents a grid of tiles in a menu 230. The menu 230 may include menu controls 232 to control aspects of the presentation of the menu 230 including, but not limited to, the number of tiles, the arrangement of tiles, the sorting of tiles, etc. The menu controls 232 may be presented as text or as a control icon 234 that, when interacted with by the video game player, generates and/or presents one or more menu controls (e.g., via a control panel UI) to adjust the appearance, select a sorting factor, update the arrangement, or change the layout of the menu 230.

FIG. 2 shows the menu 230 including a grid of tiles presenting content associated with multiple video game concepts. The term "concept" is described in more detail in reference to FIG. 4. The menu 230 may be sorted based on sorting logic as further described in FIGS. 7-13. In the grid, a first video game concept tile 240a (e.g., top left tile) may be the latest played game concept, while the second video game concept tile 240b (e.g., tile to the right of the top left file) may be the second most recently played, the most recently obtained, or the like, with the third video game concept tile 240c being less recently played or purchased than both the first video game concept tile 240a and the second video game concept tile 240c. Other ordering may be employed to arrange the tiles, as described in more detail in FIGS. 7-13.

As illustrated in FIG. 2, the library 200 presents the menu 230 with selectable tiles in the glanced state 262. The glanced state 262 (also referred to as the glanced presentation state) is a presentation state on a GUI in which limited but sufficient information is presented such that a viewer of the menu 230 can quickly assimilate the information and take action (including requesting any additional information, which then modifies the presentation state to a focused state, described below). The glanced state 262 may present tiles with application information superimposed on the tile or otherwise displayed in the menu 230. For example, a tile may include a content 250 (e.g., a logo, badge, character, screenshot, poster image, video clip, animation, etc.) representative of the video game concept associated with the game. The tile in the glanced state 262 may also show an attribute 252 and an indicator 254 or 256, whose function, contents, and purpose are described in connection with FIG. 6.

Figure 5:
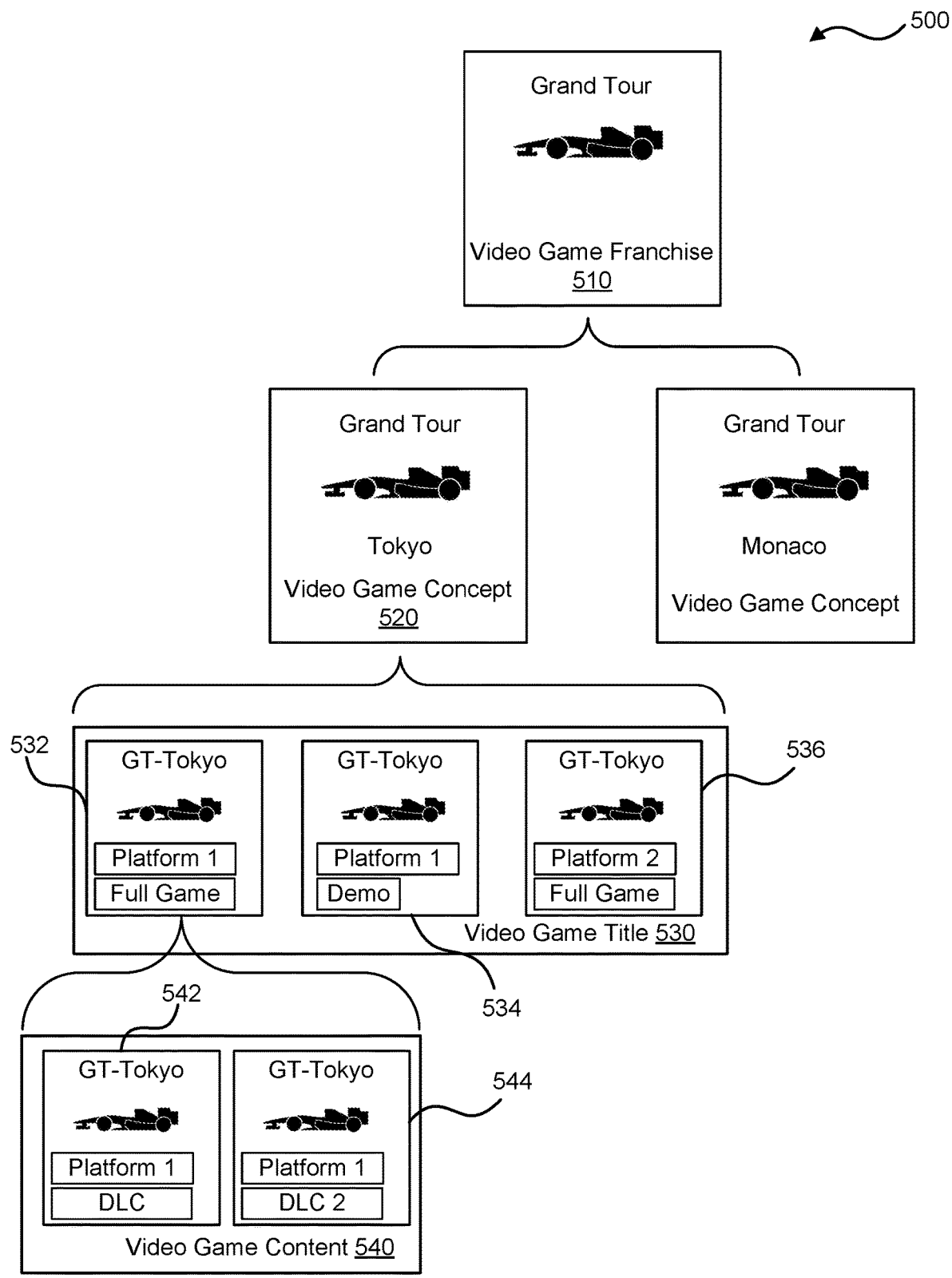
FIG. 5 illustrates an example of an application data hierarchy, according to an embodiment of the present disclosure.

A tile is an example of a UI element and corresponds to a concept defined for a single video game application, as described in more detail in reference to FIG. 5. The concept groups a set of variations of the video game application (e.g., video game application variations 140-146 of FIG. 1). Although the set can be a single variation, the set can alternatively include multiple variations. Each variation can be a video game application on its own (e.g., a different version of the video game application, such as a demo version, a trial version, a beta version, or a full release version). The tile shows content common to the variations (e.g., a logo, badge, character, screenshot, poster image, video clip, animation, etc.), indicates one of the variations (for example, using application metadata), and is linked to the one variation and/or to a page that presents more information about the concept and the variations.

As illustrated in FIG. 2, a tile is shown per video game concept. Alternatively, a concept can similarly apply to grouping a set of variations of a media application or a computer file (e.g., JPEG, BMP and other variations of a same image file, an MPEG-2, MPEG-3, MPEG-4, or other variations of an audio file, a high resolution, a medium resolution, and a low resolution, or other variations of a video file, etc.). In the case of a media application, the tile depicts content common to the variations of the media application, indicates one of the variations, and is linked to this variation and/or to a page that presents more information about the media concept and the variations. In the case of a computer file, the tile shows content common to the variations of the computer file, indicates one of the variations, and is linked to this variation and/or to a page that presents more information about the file concept and the variations. In both cases, there may be a media library or a file library, each presenting the applicable tiles similarly to the library 200.

Figure 3:
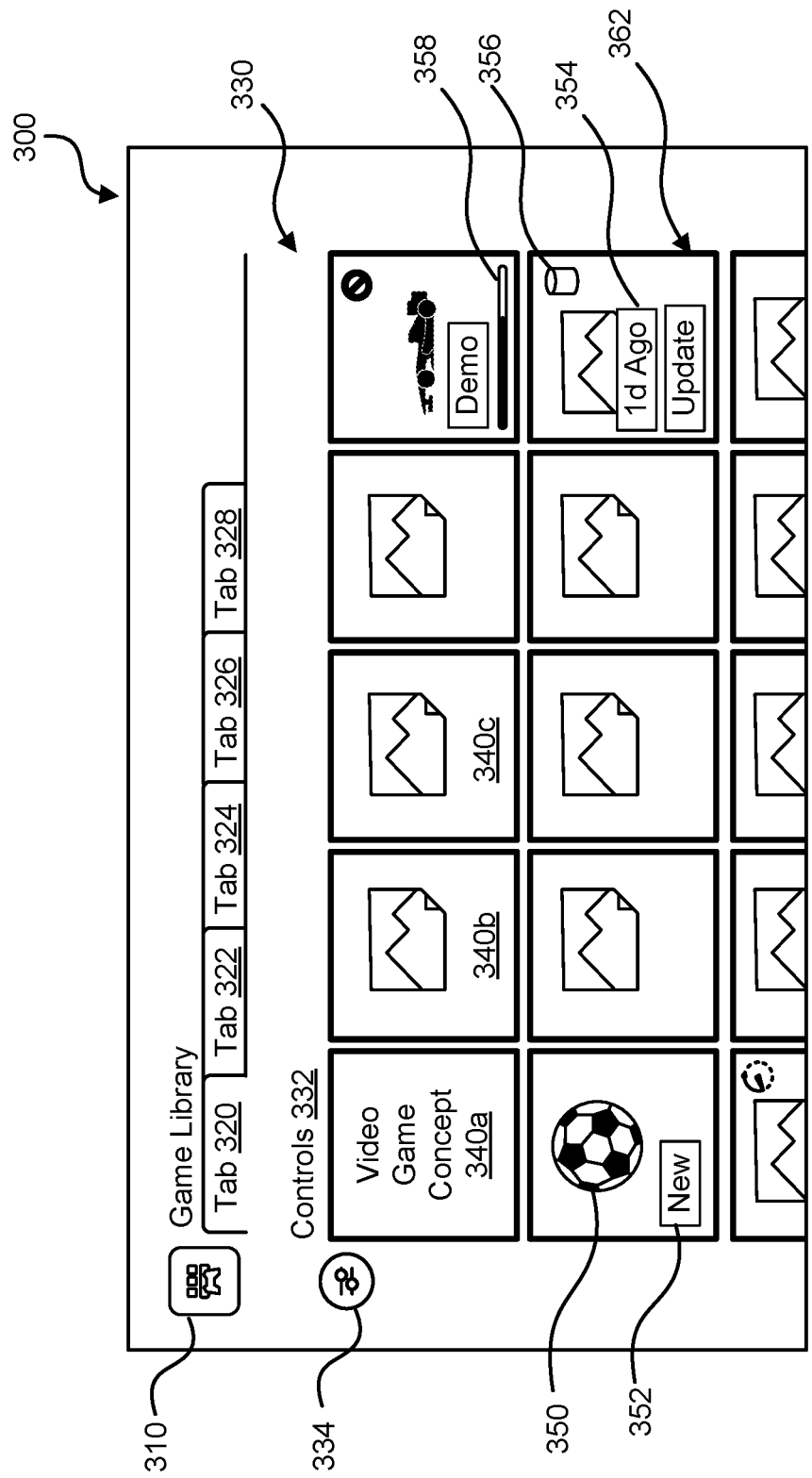
FIG. 3 illustrates another example of a library with selectable tiles in a focused state, according to an embodiment of the present disclosure.

FIG. 3 illustrates another example of a library 300 with tiles in a focused state 362, according to an embodiment of the present disclosure. The focused state 362 (also referred to as the focused presentation state) is a presentation state on a GUI in which detailed information (e.g., additional information relative to the glanced state) is presented such that a viewer of the tile can receive more description and have more options to initiate actions.

The library 300 in FIG. 3 includes an icon 310, tabs 320-328, a menu 330, and menu controls 332 and 334, fulfilling similar functions as the corresponding elements of the library 200 of FIG. 2. In general, the focused state 362 has additional application information 350 presented with the tiles, but does not affect the order or arrangement of the tiles in the menu 330 (e.g., if the video game concept tiles are preserved as from the glanced state, the video game concept tile 340a is presented in a higher position in the order relative to the video game concept tiles 340b c). The focused state 362 may be indicated graphically by a highlighted or otherwise graphically emphasized boundary on the tiles as shown in the menu 330. Relative to the glanced state, the focused state 362 may have one or more additional attributes 352 and 354 and one or more indicators 356 and 358 per tile. The set of attributes and/or indicators that are presentable in the glanced state and the different set of attributes and/or indicators that are presentable in the focused state depends on stored associations between the sets and the presentation states.

Among other benefits, implementing both the glanced and focused states may reduce demand on system resources needed to populate every tile with information, while providing pertinent info to the user. In particular, when the menu is first presented with tiles in the glanced state 262, the menu includes a minimum of relevant information to process and display. The focused state 362, being generated and/or presented in response to a user request for additional information, provides sufficient additional information only when needed.

Figure 4:
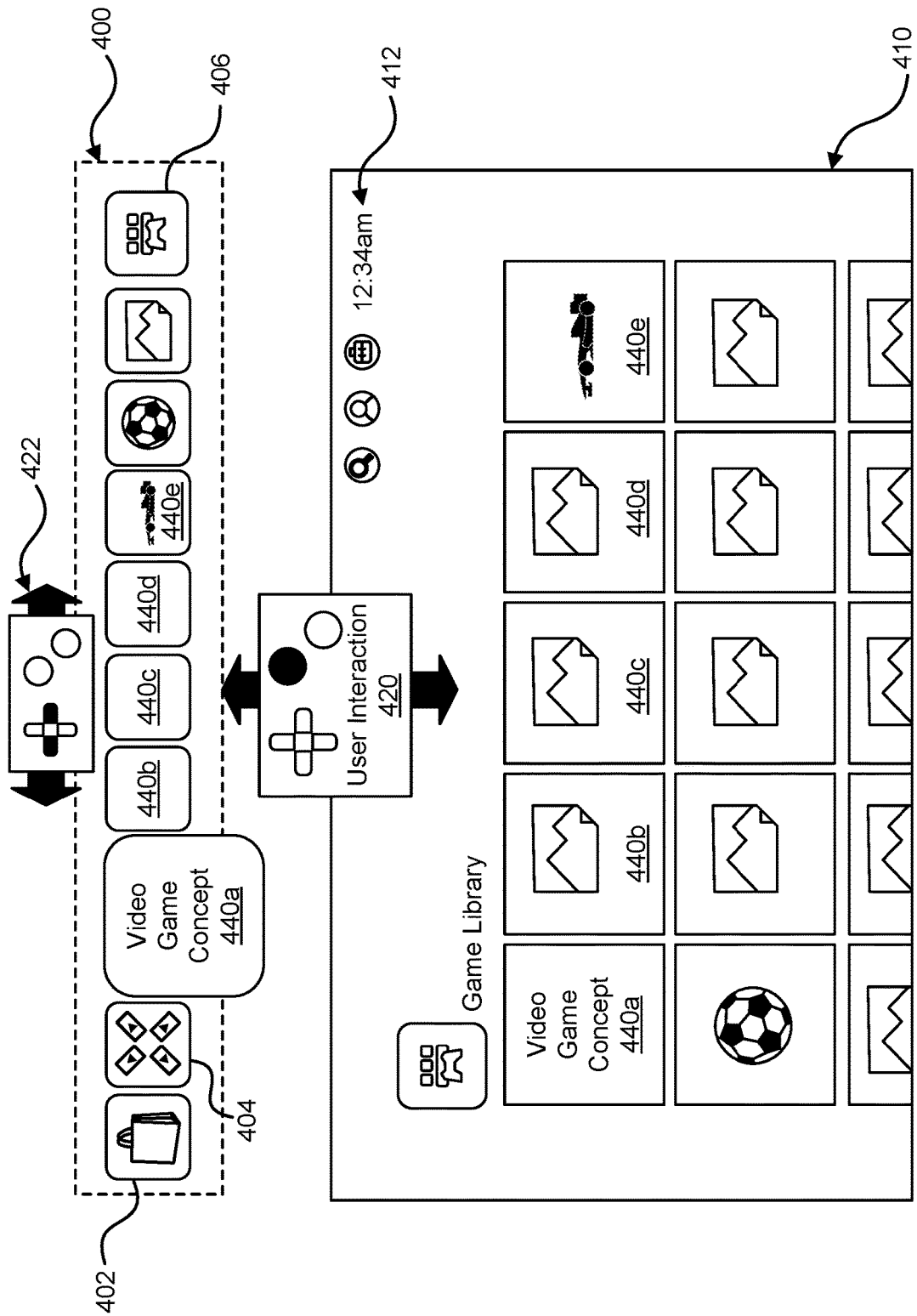
FIG. 4 illustrates an example of navigation between two menus with selectable tiles, according to an embodiment of the present disclosure.

FIG. 4 illustrates an example of navigation between two menus with selectable tiles, according to an embodiment of the present disclosure. As shown in FIG. 4, the library 410 may be accessed via a primary menu 400, also referred to as a switcher menu 400, via one or more user interactions 420 with the video game console (e.g., video game console 110 of FIG. 1). The library 410 is an example of the library 200 and library 300 of FIGS. 2-3 above. The switcher menu 400 may be presented as a user interface (UI) organizing multiple interactive UI elements, including, but not limited to, an online store element 402, a game play or game explorer element 404, and a library element 406 in, for instance, a ribbon-like presentation. Additionally or alternatively, the switcher menu 400 may include one or more video game concept tiles, reproducing the order and appearance of tiles as presented in the library 410.

Within the switcher menu 400, multiple system applications may be accessed via the interactive UI elements. For example, the online store element 402 may trigger a page (e.g., a browser interface) presenting an online store for content, applications, and other objects available for purchase (e.g., toys, clothing, experiences, etc.). Similarly, the game player or game explorer element 404 may trigger the generation and/or presentation of a page providing information about one or more video game applications and/or other content including, but not limited to, social media content associated with one or more of the video game applications presented in the library 410. For example, if the video game concept 440e represents an online multiplayer racing game, information related to the video game concept 440e posted to social media by other players affiliated with the user profile of the user of the video game console may be presented (e.g., recent race times, gameplay recordings, snapshots, or chat histories). In some embodiments, the library 410 is reversibly launched and hidden by the user interaction 420, and the switcher menu 400 is navigated by a different user interaction 422, for which one interactive UI element is highlighted to indicate the focus of the user (in FIG. 4, the interactive UI element presenting video game concept 440a is shown as emphasized). Additionally and/or alternatively, the library element 406 may be included in the switcher menu 400 to launch the library 410.

Also shown in FIG. 4 are additional UI elements 412 not illustrated in FIGS. 2-3, but which may be included in the library 410 nonetheless. For example, these may include a search tool to find a specific video game concept, account information or an account profile to facilitate switching user accounts, and a tool or control panel to launch a menu of additional UI controls and system controls. FIG. 4 is shown with the switcher menu 400 shown as a horizontal linear arrangement of UI elements, but embodiments are not limited to a single arrangement or orientation.

FIG. 5 illustrates an example of an application data hierarchy 500, according to an embodiment of the present disclosure. To better describe the video game concept, FIG. 5 illustrates the application data hierarchy 500 including a video game concept 520 and a video game title 530. For a racing game (e.g., video game concept 440e of FIG. 4), a video game franchise 510 represents every video game concept that is available to the user. In some embodiments, this may correspond to separately developed games within a family of games, each of which can be a separate video game title, such as sequels, prequels, editions, annual editions, etc. Hierarchically, the video game franchise 510 may be organized as one degree higher that the video game concept 520.

Within the video game franchise 510, one or more video game concepts may be defined. Each of the video game concept associates multiple variations of a video game title together. For example, variations 532, 534, and 536 of a single video game title 530 are associated in the video game concept 520. The video game concept 520, as opposed to the video game franchise 510, may include only variations of a single video game application (e.g., a video game title). A variation of a video game application represents one set of program code that is different from another set of program code defined for another variation of the video game application. For example, the variation can be a particular version of the video game application (e.g., a demo version, a trial version, a release version), a variation of any these versions compatible with a generation of a video game system (e.g. a video game platform), a variation of these versions specific to a geographical region, or a variation of these versions specific to a year (e.g., a 2019 release, a 2020 release, etc.). In the illustration of FIG. 5, the video game concept 520 may include a full game for a first video game platform 532, a demo of the full game for the first video game platform 532, and a full game for a second video game platform 536 for the same video game title 530 (e.g., "Grand Tour-Tokyo").

The data hierarchy 500 may define multiple hierarchy levels for a video game concept. For instance, the data hierarchy 500 may include, subordinate to a video game title or any of its variations. These subordinates can also be referred to as variations of the video game title. For instance, a variation with a particular set of game levels and/or events can be a subordinate. This is shown in FIG. 5 with video game content 540 that may be associated with one of the video game variations (e.g., the variation 532 corresponding to a full release for the first platform). Examples of video game content 540 may include, but are not limited to, featured add-on content, patches, limited-time online events, or the like. For example, a first downloadable content (DLC) module 542 and a second DLC module 544 may be associated with the full release for the first platform (e.g., the variation 532).

Figure 6:
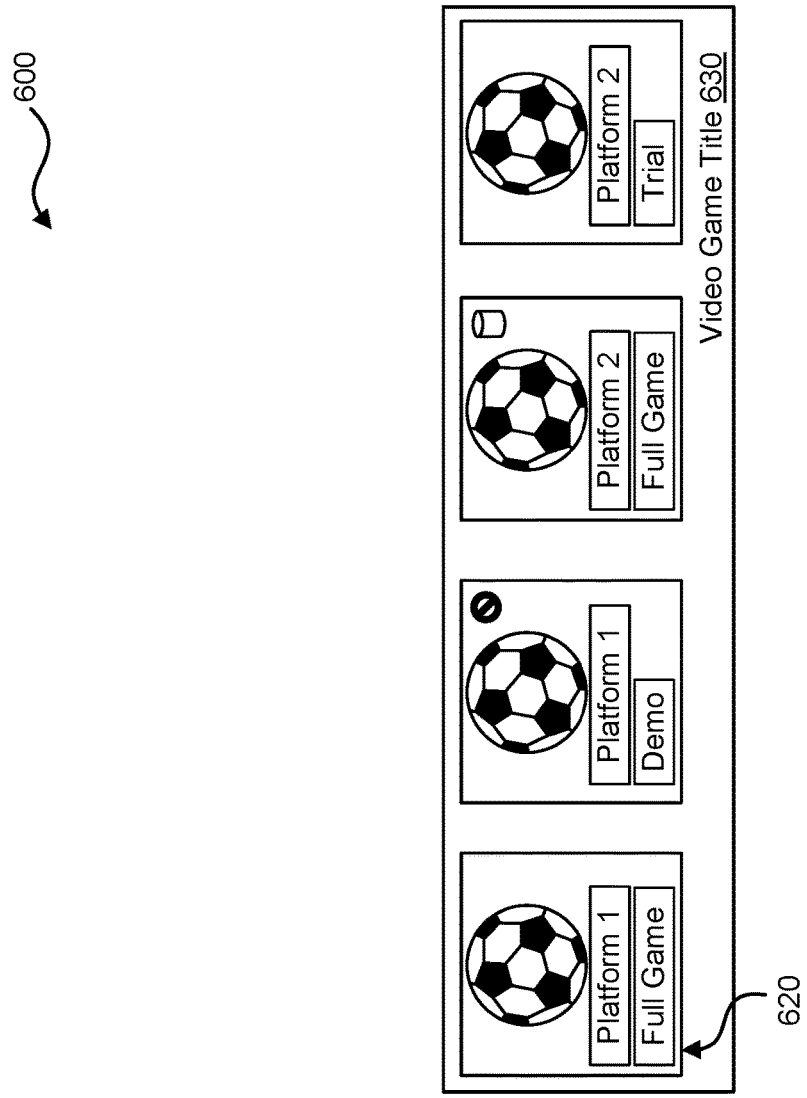
FIG. 6 illustrates an example of a technique for application variation selection for presentation of content in a menu, according to an embodiment of the present disclosure.
Figure 6:
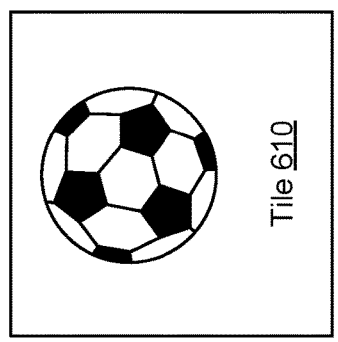

FIG. 6 illustrates an example of a technique 600 for application variation selection for presentation of content in a menu, according to an embodiment of the present disclosure. As illustrated in FIG. 6, a tile 610 represents a video game concept. The video game concept can group multiple variations of a same video game title. In the example illustrated, the tile shows 610 content common to the different variations (e.g., a poster image, a short video clip, an animation, and/or other multimedia content). The tile 610 also indicates one of the variations (e.g., with indicators and/or attributes), where this variation is selected based on logic and corresponds to the one that is likely most relevant to a user. Because the user's interest can change over time, the tile 610 is dynamically updated to change the indication and reflect the latest selected variation of likely most interest to the user. The content may not change.

For example and as illustrated in FIG. 5, the variations of the video game title include a full release for a first video game platform, a demo release for the first video game platform, a full release for a second video game platform, and a trial version for the second video game platform. As indicated by attribute and indicator information, the tile 610 is updated over time to indicate each of the variations upon a selection of that variation. Hence, when the user's interest likely corresponds to the first variation, the tile 610 indicates the full release for a first video game platform. When the user's interest likely corresponds to the second variation, the tile 610 indicates the demo release for the first video game platform. When the user's interest likely corresponds to the third variation, the tile 610 indicates the full release for the second video game platform. And when the user's interest likely corresponds to the fourth variation, the tile 610 indicates the trial version for the second video game platform. These dynamic updates to the tile 610 are shown with the element labeled 620 in FIG. 6.

As described herein above, the tile 610 indicates one of the variations at a time, and can be linked to this variation. The selection of the variation from the multiple variations is based on a set of logic implemented by a library application (e.g., the library application 152 of FIG. 1). In some cases, the logic for the selection can rely on different factors depending on a user interaction with a variation, as described in more detail in reference to FIG. 8, below.

In some embodiments, a variation is selected by the library application by prioritizing one or more characteristics of the variations. For example, priority may be given to playable variations over non-playable variations, where playability implicates access privileges and permissions including, but not limited to, sharing, ownership, association of a variation with the account through which the video game application would be accessed. In reference to the video game title 630 illustrated in FIG. 6, a playable demo release for the first video game platform may be prioritized over a non-playable full release for the same platform. The selection may also prioritize backwards-compatible variations over non-backwards compatible variations, installed variations over not installed variations, variations compatible with new or next-generation video game console systems over variations compatible previous or legacy video game console systems. Furthermore, priority may be given to full versions of the video game application over partial or developmental versions. For example, a developmental version (e.g., alpha or beta versions) may be prioritized over a demo version. Similarly, a full version may be prioritized over a beta version and a demo version.

In addition, when regional variations of the video game application exist, a variation may be selected based on regional information associated with the user of the console system or a location of the console system (e.g., network location or geographic location). For example, the user of the console system may have an account on that is identified with a geographic region (e.g., Japan, North America, etc.). In such cases, the console system may include multiple variations, each corresponding to a region (e.g., a Japanese variation and a North American variation), for which priority can be given to the regional variation corresponding to the geographic region identified with the account of the user. In some embodiments, when multiple variations identified with the same geographic region are available (e.g., installed), priority is given to the most recent variation (e.g., most recently installed variation). Similarly, if the variations are not installed, priority may be given to variations depending on availabilities. Examples of such availabilities include, but are not limited to, variations available from online gaming platforms associated with the console system, most recently purchased variations, most recently available variations, or the like.

Figure 7:
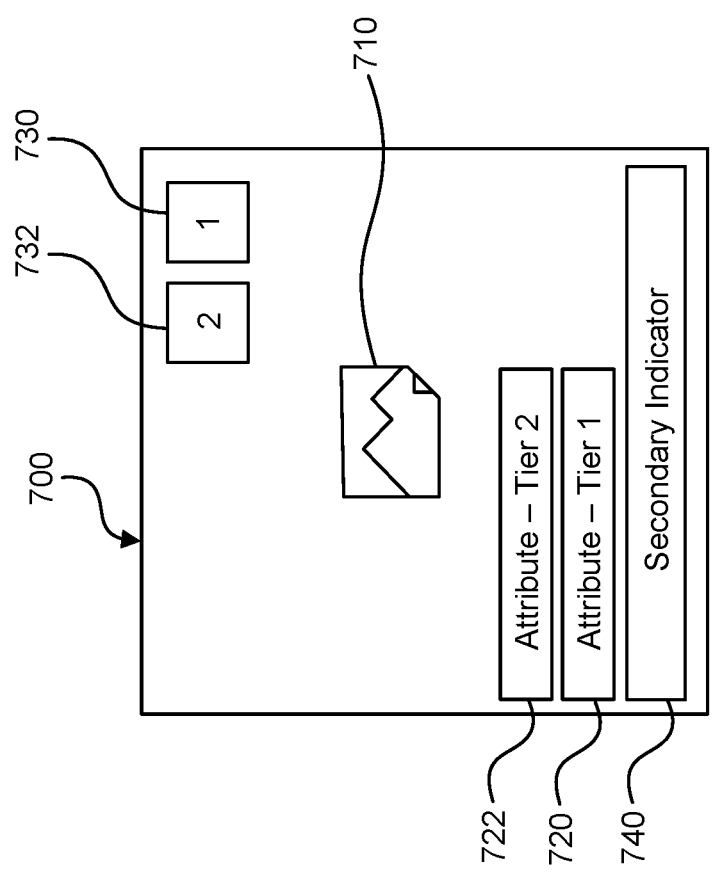
FIG. 7 illustrates an example of a selectable tile, according to an embodiment of the present disclosure.

FIG. 7 illustrates an example of a selectable tile 700, according to an embodiment of the present disclosure. Generally, the tile 700 is an example of a UI element that represents a set of variations of a video game application. The layout and composition of the tile 700 illustrated in FIG. 7 is an example of one of several possible visualization approaches. While the tile 700 is shown with a number of containers (indicated with elements numbers 720, 722, 730, 732, and 740) oriented in regions of the tile 700 and superimposed over a visual motif 710 representative of the video game concept (e.g., content common to the different variations associated with the video game concept), the information described in reference to the containers may also be presented elsewhere. For example, the tile 700 may present only a subset of the containers, while others are presented outside the boundary of the tile 700. In another example, the tile 700 may be presented as a list or a detailed list, with information arranged in a table oriented horizontally and/or vertically relative to the tile 700, such that the visual motif 710 serves as an icon and/or badge in one entry of a list entry and the containers (or content thereof) can be shown in one or more entries of the list entry.

In some embodiments, the tile 700 includes one or more attributes and indicators. The attribute(s) and indicator(s) can be presented in the containers. A first set of attributes and/or indicators can be associated with a glanced state (e.g., the glanced state 262 of FIG. 2), and a second set of attributes and/or indicators can be associated with a focused state (e.g., the focused state 362 of FIG. 3). Given these associations, the number of containers and/or content thereof can change depending on the presentation state (e.g., the glanced state or the focused state). Further, attributes may be organized in tiers, such as a first tier 720 or a second tier 722, although additional tiers are available as needed. With regard to glanced and focused presentation states, the focused state may present additional and/or differing information to that presented in the glanced presentation state.

In some cases, the first tier attributes 720 represent metadata for application variation of the video game application, where the variation is indicated by the tile 700. Examples of metadata include, but are not limited to, information describing the use and newness of the variation (e.g., whether the variation is new or newly updated, when it was last played, when it was purchased or available, etc.). The metadata may also include information about the file size of the variation (e.g., to identify to the user of the video game console information related to storage capacity and file sizes). Similarly, the metadata may include usage data including, but not limited to, cumulative play time (e.g., "hours played"), recent accomplishments, and/or other available content-related information items (e.g., tournament date, item available, reward earned, etc.).

In comparison, the second tier attributes 722 represent supplementary metadata to the first tier attributes 720. Supplementary metadata may include, but is not limited to, platform information (e.g., new or next-generation console, previous or legacy console, etc.), version information and/or application type (e.g., beta, trial, demo, full game, etc.), information indicating the type of video game content, as when the variation includes video game content (e.g., DLC, temporary campaign mission options, etc.). In some embodiments, the tile 700 may show multiple second tier attributes 722, for example, the platform information and the version information (e.g., a beta version on a legacy console). In some embodiments, one or more of the second tier attributes 722 are presented in the focused state, while the glanced state presents only one or more of the first tier attributes 720. In this case, the second tier attributes 722 are associated with the focused state only, whereas the first tier attributes 720 are associated with both the presentation states.

In some embodiments, the library application can select a limited number of metadata entries to present as first tier attributes 720 and second tier attributes 722 with the tile 700. The selection may proceed based on sorting of attributes and/or on a priority ranking of the attributes. For example, information describing new variations or newly updated variations may be prioritized over information describing the date of purchase or availability of a variation. Second tier attributes 722, being descriptive of the variation, may be selected based on characteristics of the variation. For example, if the variation is a demo version on a next-generation console, the second tier attributes presented with the tile 700 may reflect that information.

The indicators may belong to several orders, including, but not limited to, primary and secondary orders, with tiers defined for each order. For example, a primary indicator of the first tier 730 may be presented in association with the tile 700 to represent, among other aspects, the "access status" for the variation that is indicated by the tile 700. In some embodiments, "access status" indicates whether and in what form the variation is available for execution. As an illustrative example, in the glanced state, the primary indicator of the first tier 730 may indicate that the variation is "pre-ordered," which is to say that the variation has been purchased or otherwise reserved, but has not yet been published or otherwise made available for distribution via a computer network. In some embodiments, multiple first tier primary indicators 730 may describe the access status of the variation, in which case the library application may implement a selection process to select an indicator to present as part of the tile 700. In some cases, the tile only presents a single indicator of each tier, and as such may select an indicator based on a priority ranking defined for each of the possible indicator values. For example, compatibility indicators may have a higher priority than platform indicators, and media-type indicators may have a higher priority than access-lock indicators. In some embodiments, some types of information for the primary indicator of the first tier 730 is only presented with the tile 700 in the focused state. For example, in the glanced state, the first tier primary indicator may present information when the variation is inaccessible, while in the focused state access information may be available describing whether and how the variation is accessible (e.g., located on local storage media, accessible from a content network, etc.).

The primary indicator of the second tier 732 may present additional information describing storage status including, but not limited to, whether the variation is installed and on which video game platform it is installed. For example, the primary indicator of the second tier 732 may provide information describing whether data associated with the variation is stored locally on the video game console, on an external hard drive in communication with the video game console, or is otherwise available for download. To indicate that a download is necessary to access the variation, the primary indicator of the second tier 732 may provide information to that effect, for example, by showing an icon representing a download process. As with the primary indicator of the first tier 730, in some embodiments, the tile 700 may only show a single primary indicator of the second tier 732, which is selected from amongst the applicable indicators describing the storage status of the video game application associated with the tile 700.

The secondary indicator 740 may be included with the tile 700 to provide dynamic information related to system processes associated with the variation. For example, the secondary indicator may be presented as a graphical progress bar showing, by a combination of visual effects including, but not limited to color, dynamic elements, shading, and/or lighting effects. For example, the secondary indicator 740 may indicate a download in progress by a progress bar with a gradient shading, showing the extent to which the download has progressed for the variation in real time. In another example, the secondary indicator 740 may show a progress bar with a different color (e.g., a solid red progress bar showing the download extent at the time the error occurred) to indicate a progress event or download type including, but not limited to, a complete download, an update download, a patch download, or the like.

Figure 8:
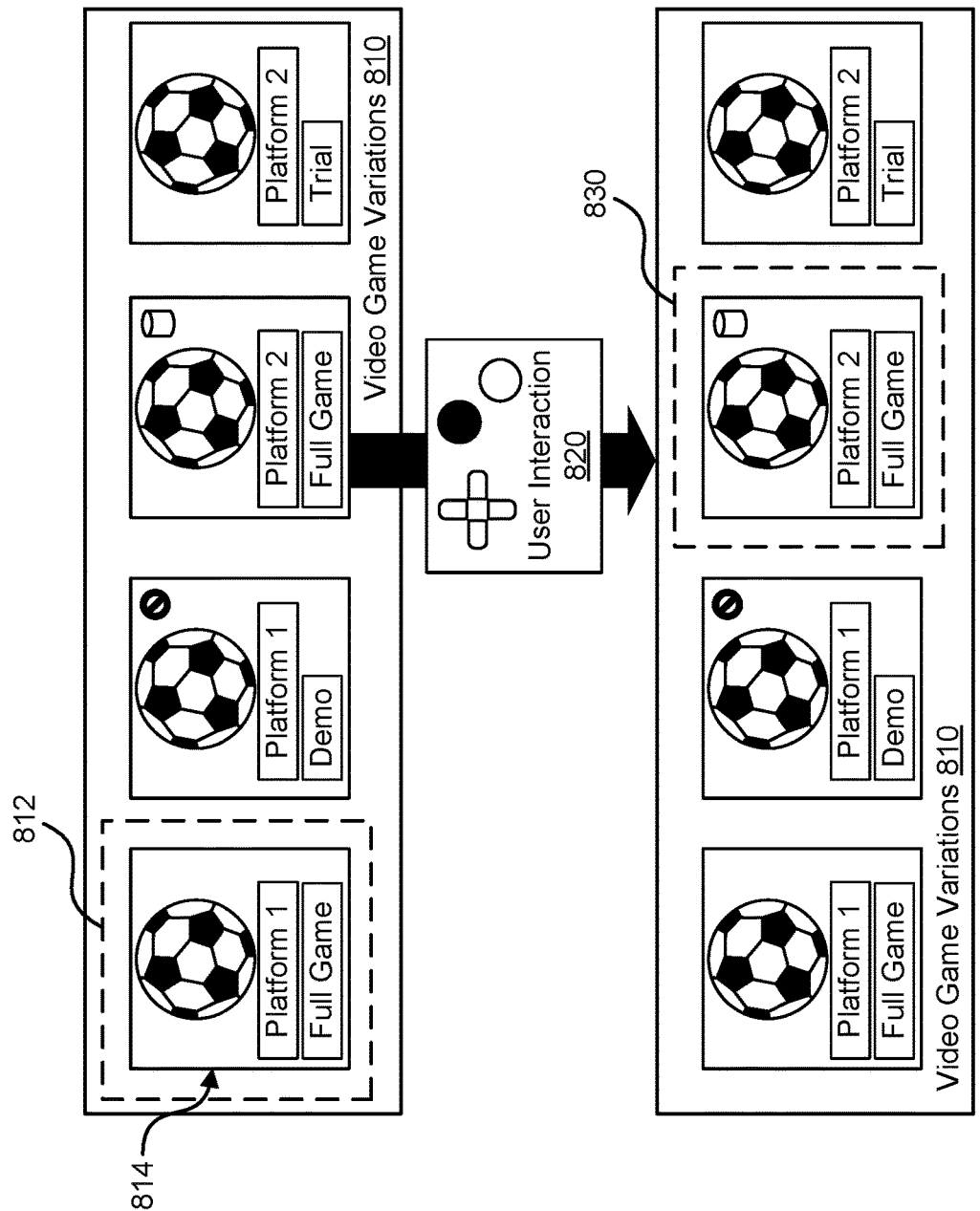
FIG. 8 illustrates an example technique for dynamically indicating a variation of an application in a tile, according to an embodiment of the present disclosure.

FIG. 8 illustrates an example technique 800 for dynamically indicating a variation of an application in a tile, according to an embodiment of the present disclosure. As described in reference to FIG. 5, a concept groups multiple variations of a same computer application. As described in reference to FIG. 6, a library application can present the concept in a tile and select one of the variations to indicate in the tile. In FIG. 6, a selection logic is described, where this selection logic applies a set of factors prior to a user interaction with the tile. Here in FIG. 8, the technique 800 including applying the selection logic, where the selection logic uses a second set of factors based on the last user interaction with the tile or any of the variations grouped in the concept, in the interest of prioritizing user interest for a variation from amongst the number of variations. In general, this prioritization can be facilitated by logging user interactions on a user specific basis and on a console specific basis (e.g., the selection can be different depending on the user and depending on the video game console on which the user is logged in).

As shown in FIG. 8, a video game variation 814 is selected (e.g., the first variation shown in FIG. 8 and corresponding to a full release for a first video game platform) and indicated in a tile 812 from amongst a number of video game variations 810, before the console receives a user interaction 820. In the illustrated example of the technique 800, the user interaction 820 is with a different video game variation (e.g., the third variation shown in FIG. 8 and corresponding to a full release for a second video game platform). The user interaction 820 triggers the application of the selection logic with the second set of factors, resulting in a reselection of an updated tile 830. The second set of factors include, but are not limited to, whether a video game variation is played and/or launched, whether a video game variation is downloaded, copied, and/or installed from external media, whether the video game variation is selected via a menu operation through the library (e.g., by clicking on the tile 812 to receive a list of the variations and selecting one of them) or externally to the library (e.g., by selecting the variation from a page about the video game concept), whether the video game variation is purchased or otherwise obtained and is new to the system, or the like. The purpose of prioritizing such user interactions, as described previously, is to dynamically select and indicate the variation in the tile, where this variation best reflects the user interest. In some embodiments, the user interaction 820 may not trigger reselection in some cases including, but not limited to, when a video game variation is made available from an external hard drive to which it has already been installed, as this may not reflect user preference for a video game variation without additional data describing the user's interaction history with the relevant video game variation (e.g., a "last played" data point). Similarly, if the user interaction 820 concerns a video game variation that is not operable (e.g., uninstalled, not backwards compatible, etc.), the user interaction 820 may not trigger reselection based on the interaction. In the specific case of uninstallation, a user interaction to uninstall a video game variation may trigger reselection according to the priority factors described in reference to FIG. 6, above, rather than according to those of the interaction update triggers described here in reference to FIG. 8.

Figure 9:
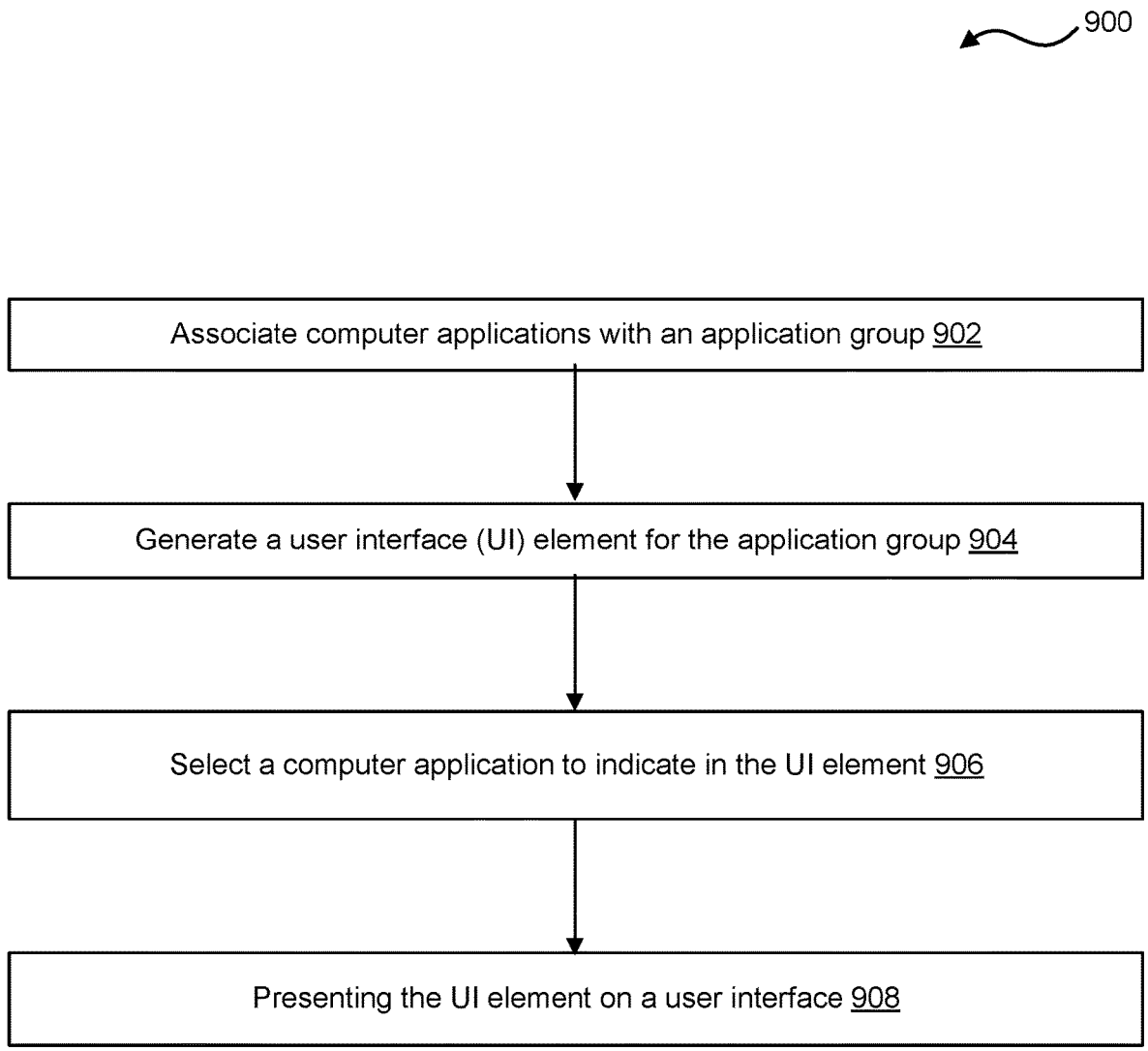
FIG. 9 illustrates an example flow for presenting content in an interactive menu, according to embodiments of the present disclosure.

FIG. 9 illustrates an example flow 900 for presenting content in an interactive menu, according to embodiments of the present disclosure. The operations of the flow can be implemented as hardware circuitry and/or stored as computer-readable instructions on a non-transitory computer-readable medium of a computer system, such as the video game console 110 of FIG. 1. As implemented, the instructions represent modules that include circuitry or code executable by a processor(s) of the computer system. The execution of such instructions configures the computer system to perform the specific operations described herein. Each circuitry or code in combination with the processor represents a means for performing a respective operation(s). While the operations are illustrated in a particular order, it should be understood that no particular order is necessary and that one or more operations may be omitted, skipped, and/or reordered.

In an example, the flow 900 includes an operation 902, where the computer system associates computer applications with an application group. As described in more detail in reference to FIG. 5, the computer system implements an application hierarchy whereby variations of the same computer application are associated with the application group. In FIG. 5, the application group may refer to any tier of the hierarchy (e.g., video game title 530, video game concept 520, or video game franchise 510 of FIG. 5). In some cases, the application group may include a single variation, while in others multiple variations may be associated with the application group. The association may be based, for example, on metadata including, but not limited to, identifier information associating the variations with the application group (e.g., a content/item identifier for the title may include a grouping number). The metadata may be provided by the application developer or it may be assigned by a content platform following meta-analysis of relevant information (e.g., developer identification, application title, console or system compatibility, application type, etc.). As described above, the computer system may similarly develop an analogous hierarchy for content of other types (e.g., media applications, computer files, etc.).

In an example, the flow 900 includes an operation 904, where the computer system generates a UI element for the application group. As described in more detail in reference to FIG. 6, the application group (e.g., video game concept) is presented in a user interface, such as a GUI, by the UI element. A tile is an example of the UI element. The UI element is presented with one or more metadata elements, as described in more detail in reference to FIG. 7. For example, the UI element may be presented with one or more attributes (e.g., first tier attribute 720 of FIG. 7), indicators (e.g., primary indicator of the first tier 730 of FIG. 7), and/or a visual motif (e.g., visual motif 710 of FIG. 7).

In an example, the flow 900 includes an operation 906, where the computer system selects a computer application to indicate in the UI element. The computer system prioritizes in its selection the computer application that best reflects a user's interest, by applying one or more priority factors that take into account the user's last interaction, if any, with the application group and/or one of the variations. For example, as described in more detail in reference to FIG. 6 and FIG. 8, prior to any user interaction or following an uninstallation, the computer system may have a first set of priority factors. Upon a user interaction (e.g., user interaction 820 of FIG. 8), the computer system may apply a different, second set of priority factors.

In an example, the flow 900 includes an operation 908, where the computer system presents the UI element on a user interface. As described in more detail in reference to FIGS. 2-4, the user interface may include the library, as generated and/or presented by the library application (e.g., the library application 152 of FIG. 1). The user interface may include a menu (e.g., the menu 230 of FIG. 2) including one or more UI elements each associated with a different application group and indicating a different selected computer application. For example, a first UI element may identify (e.g., through a visual motif) a racing video game application group including multiple video game application variations, where the UI element indicates (e.g., through metadata elements) a selected video game application variation. The computer system may generate and/or present the user interface to present the UI elements in a glanced state or a focused state, as described in more detail in reference to FIG. 11, below.

Figure 10:
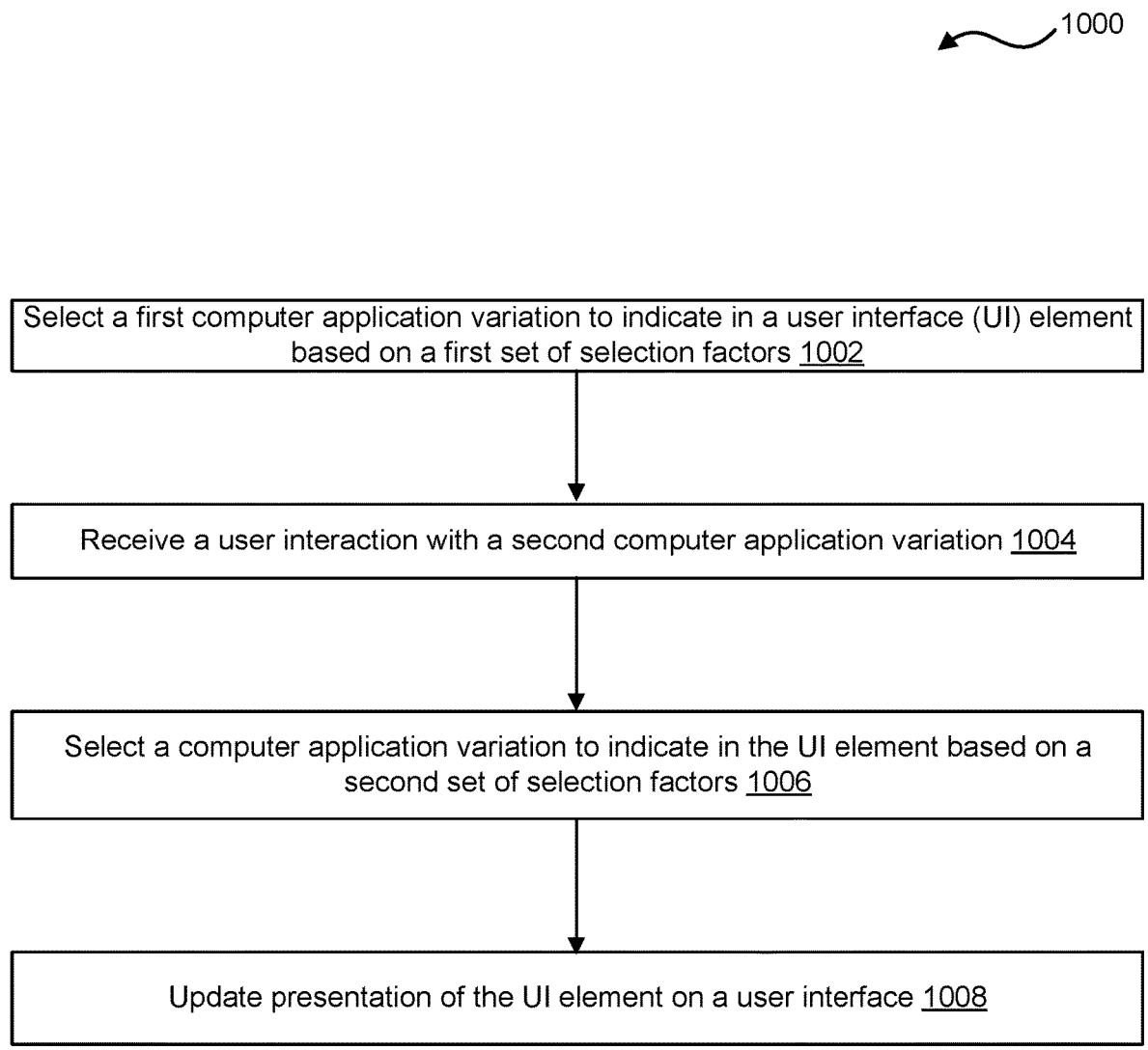
FIG. 10 illustrates an example flow for updating a presented UI element, according to embodiments of the present disclosure.

FIG. 10 illustrates an example flow 1000 for updating a presented UI element, according to embodiments of the present disclosure. The operations of the flow can be implemented as hardware circuitry and/or stored as computer-readable instructions on a non-transitory computer-readable medium of a computer system, such as the video game console 110 of FIG. 1. As implemented, the instructions represent modules that include circuitry or code executable by a processor(s) of the computer system. The execution of such instructions configures the computer system to perform the specific operations described herein. Each circuitry or code in combination with the processor represents a means for performing a respective operation(s). While the operations are illustrated in a particular order, it should be understood that no particular order is necessary and that one or more operations may be omitted, skipped, and/or reordered.

In an example, the flow 1000 includes an operation 1002, where the computer system selects a first computer application variation to indicate in a UI element based on a first set of selection factors. As described in more detail in reference to FIG. 6, the first set of selection factors may include a first priority of an executable variation of the computer application over a non-executable variation of the computer application. In some embodiments, whether a computer application is executable (e.g., playable for a video game application) is determined based at least in part on a user account and access privileges associated with the variation on the computer system. For example, a user of a video game console may not have access privileges (e.g., have purchased or been invited to share) for a video game application variation included in an application group that is installed or otherwise available to another user of the video game console having access privileges. In this example, the video game application variation may not be prioritized (e.g., selected for indication in the UI element), unless the user has valid access privileges. The first set of selection factors may also include a second priority of a backward compatible variation of the computer application variation over a non-backward compatible variation of the computer application. The first set of selection factors may also include a third priority of an installed variation of the computer application over a non-installed variation of the computer application. The first set of selection factors may also include a fourth priority of a compatible variation of the computer application with a computer device generation over another compatible variation of the computer application with a previous computer device generation. The first set of selection factors may also include a fifth priority of a full version of the computer application over a beta version of the computer application and over a demo version of the computer application. The first set of selection factors may also include a sixth priority of a regional variation of the computer application for a region associated with the user identifier over another variation of the computer application for a different region.

In an example, the flow 1000 includes an operation 1004, where the computer system receives a user interaction with a second computer application variation. As described in more detail in reference to FIG. 8, the user interaction may include, but is not limited to, launching and/or executing the second computer application variation (e.g., playing a video game application variation other than the video game application variation indicated in the UI element), downloading, copying into memory, installing from media, or otherwise providing the second computer application variation to the computer system, selecting the second computer application variation via a different user interface of the computer system (e.g., the switcher application 154 of FIG. 1, the menu application 150 of FIG. 1, etc.), purchasing the second computer application variation by the user.

In an example, the flow 1000 includes an operation 1006, where the computer system selects a computer application variation to update and indicate in the UI element based on a second set of selection factors. As described in reference to FIG. 8, the second set of selection factors may be different from the first set of selection factors, and may include any or all of the user interaction types described above. In some cases, the computer system may employ the first set of selection factors despite receiving a user interaction with a computer application variation. For example, if the user interaction concerns uninstalling the computer application variation, the computer system may employ the first set of selection factors to determine the computer application variation to indicate in the UI element. Similarly, user interactions concerning non-backwards compatible computer application variations that are not executable may not cause the computer system to select the computer application variation according to the second set of selection factors.

In an example, the flow 1000 includes an operation 1008, where the computer system updates the presentation of the UI element on a user interface. As described in more detail in reference to FIG. 8, reselection in response to user interaction may trigger an update of the UI element in accordance with the second set of selection factors. In turn, the presentation of the UI element, including metadata elements (e.g., attributes and indicators) would be updated and presented as well to indicate the newly selected computer application variation.

Figure 11:
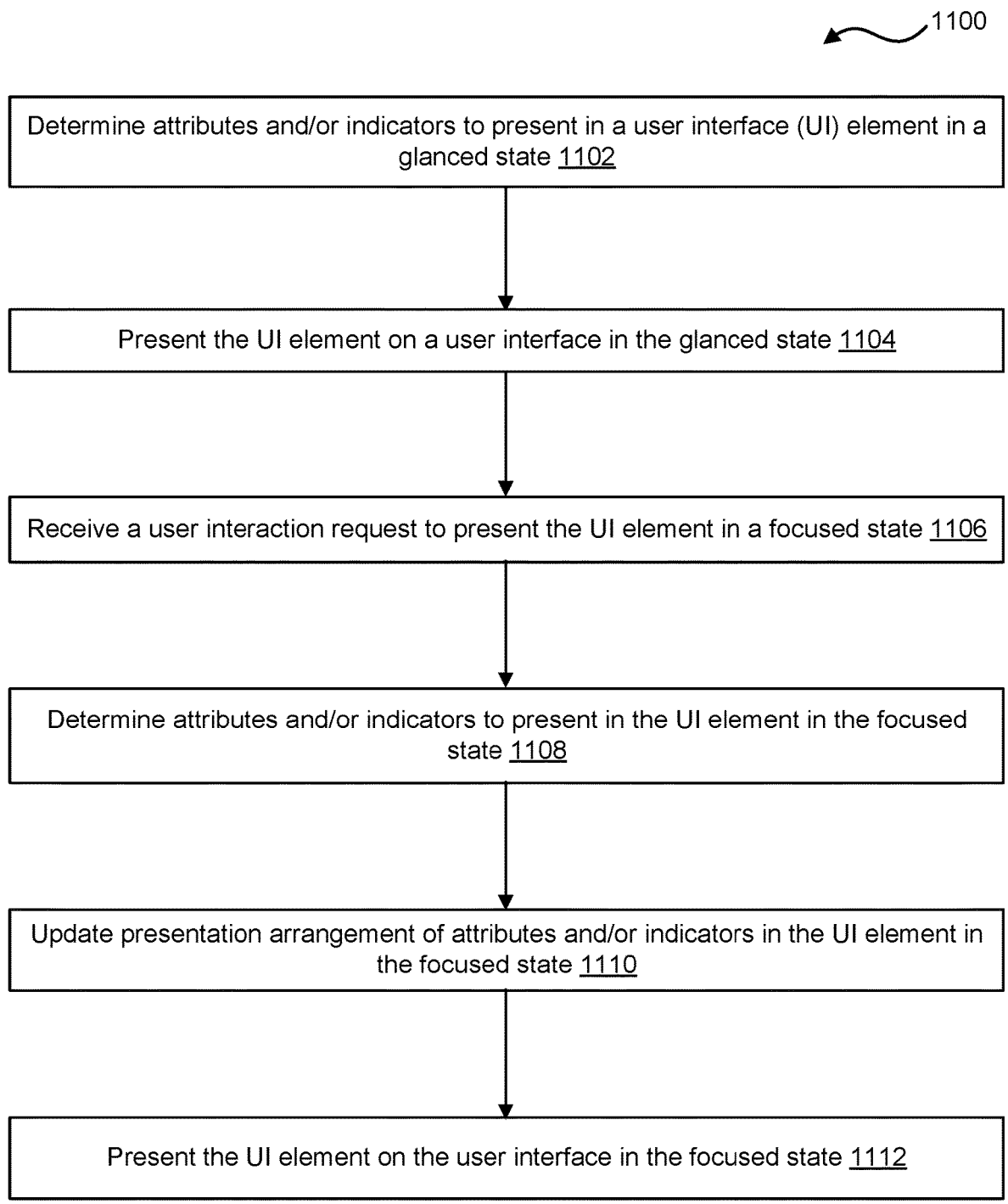
FIG. 11 illustrates an example flow for presenting an interactive menu including selectable tiles in the focused state, according to embodiments of the present disclosure.

FIG. 11 illustrates an example flow 1100 for presenting an interactive menu including selectable UI elements in the focused state, according to embodiments of the present disclosure. The operations of the flow can be implemented as hardware circuitry and/or stored as computer-readable instructions on a non-transitory computer-readable medium of a computer system, such as the video game console 110 of FIG. 1. As implemented, the instructions represent modules that include circuitry or code executable by a processor(s) of the computer system. The execution of such instructions configures the computer system to perform the specific operations described herein. Each circuitry or code in combination with the processor represents a means for performing a respective operation(s). While the operations are illustrated in a particular order, it should be understood that no particular order is necessary and that one or more operations may be omitted, skipped, and/or reordered.

In an example, the flow 1100 includes an operation 1102, where the computer system determines attributes and/or indicators to present in a UI element in a glanced state. As described in more detail in reference to FIG. 2, the glanced state, also referred to as the non-focused state, describes a presentation state of the UI element wherein the UI element is presented with data (e.g., metadata elements including attributes and/or indicators) as described in more detail in reference to FIG. 7, and FIG. 9, above. These attributes and/or the indicators can be pre-associated with the glanced state.

In an example, the flow 1100 includes an operation 1104, where the computer system presents the UI element in a menu in the glanced state. As described in more detail in reference to FIG. 2, the computer system may include a library application (e.g., the library application 152 of FIG. 1) that generates and/or presents the UI elements in the menu (e.g., the menu 230 of FIG. 2) as part of a library (e.g., library 200 of FIG. 2).

In an example, the flow 1100 includes an operation 1106, where the computer system receives a user interaction requesting to present the UI element in a focused state. The user interaction may include one or more forms of interaction, as determined by the functionality of the computer system. For example, in a video game console system, the user interaction may include one or more controller actions (e.g., a button-press or joystick press). Similarly, the user interaction may include gestures, voice commands, keyboard commands, mouse clicks, etc.

In an example, the flow 1100 includes an operation 1108, where the computer system determines attributes and/or indicators to present in the UI element in the focused state. The focused state, as described in more detail in reference to FIG. 3 and FIG. 7, may be associated with additional and/or alternative data of the same data types and/or alternative data types. As described in reference to FIG. 7, data types may include access status data, platform data, version data, compatibility data, etc. These attributes and/or the indicators can be pre-associated with the focused state.

In an example, the flow 1100 includes an operation 1110, where the computer system updates the content of the UI elements in the focused state. As described above in reference to FIG. 7, the focused state includes additional containers for data (e.g., metadata elements), that may be presented superimposed over and/or with the UI element in the menu. As such, the computer system arranges the appropriate data for the focused presentation state based on presentation formats for the UI elements. For example, the focused state may present second tier indicators (e.g., primary indicator of the second tier 732 of FIG. 7), second tier attributes (e.g., second tier attribute 722 of FIG. 7), in addition to first tier indicators (e.g., primary indicator of the first tier 722 of FIG. 7) and first tier attributes (e.g., first tier attribute 720 of FIG. 7).

In an example, the flow 1100 includes an operation 1112, where the computer system presents the UI elements on the user interface in the focused state. As updated, each of the UI elements includes the additional containers for data when presented in the menu in the focused state.

Figure 12:
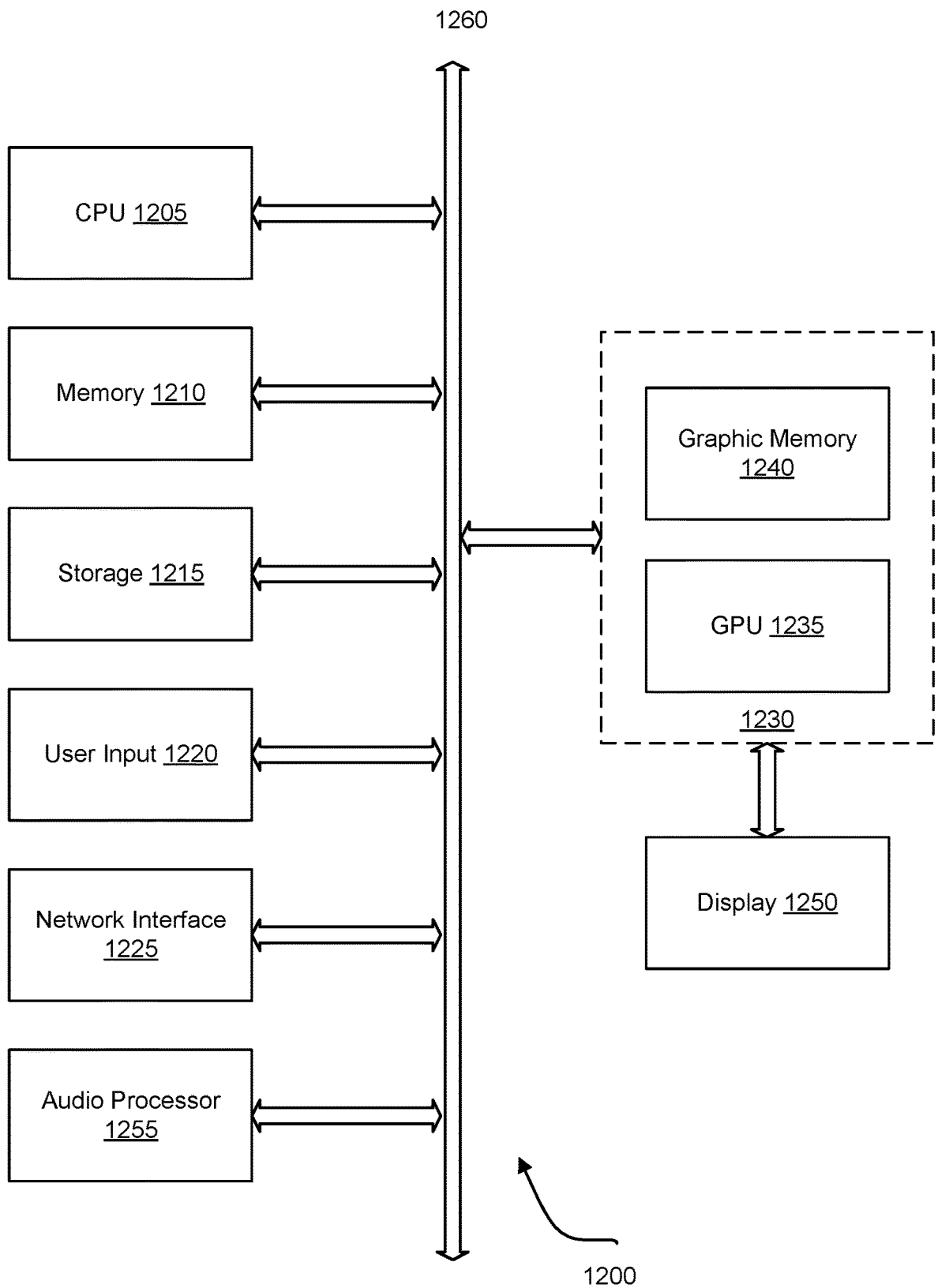
FIG. 12 illustrates an example of a hardware system suitable for implementing a computer system, according to embodiments of the present disclosure.

FIG. 12 illustrates an example of a hardware system suitable for implementing a computer system, according to embodiments of the present disclosure. The computer system 1200 represents, for example, a video game system, a backend set of servers, or other types of a computer system. The computer system 1200 includes a central processing unit (CPU) 1205 for running software applications and optionally an operating system. The CPU 1205 may be made up of one or more homogeneous or heterogeneous processing cores. Memory 1210 stores applications and data for use by the CPU 1205. Storage 1215 provides non-volatile storage and other computer readable media for applications and data and may include fixed disk drives, removable disk drives, flash memory devices, and CD-ROM, DVD-ROM, BLU-RAY DISC®, HD-DVD, or other optical storage devices, as well as signal transmission and storage media. User input devices 1220 communicate user inputs from one or more users to the computer system 1200, examples of which may include keyboards, mice, joysticks, touch pads, touch screens, still or video cameras, and/or microphones. Network interface 1225 allows the computer system 1200 to communicate with other computer systems via an electronic communications network, and may include wired or wireless communication over local area networks and wide area networks such as the Internet. An audio processor 1255 is adapted to generate analog or digital audio output from instructions and/or data provided by the CPU 1205, memory 1210, and/or storage 1215. The components of computer system 1200, including the CPU 1205, memory 1210, data storage 1215, user input devices 1220, network interface 1225, and audio processor 1255 are connected via one or more data buses 1260

A graphics subsystem 1230 is further connected with the data bus 1260 and the components of the computer system 1200. The graphics subsystem 1230 includes a graphics processing unit (GPU) 1235 and graphics memory 1240. The graphics memory 1240 includes a display memory (e.g., a frame buffer) used for storing pixel data for each pixel of an output image. The graphics memory 1240 can be integrated in the same device as the GPU 1235, connected as a separate device with the GPU 1235, and/or implemented within the memory 1210. Pixel data can be provided to the graphics memory 1240 directly from the CPU 1205. Alternatively, the CPU 1205 provides the GPU 1235 with data and/or instructions defining the desired output images, from which the GPU 1235 generates the pixel data of one or more output images. The data and/or instructions defining the desired output images can be stored in the memory 1210 and/or graphics memory 1240. In an embodiment, the GPU 1235 includes 3D rendering capabilities for generating pixel data for output images from instructions and data defining the geometry, lighting, shading, texturing, motion, and/or camera parameters for a scene. The GPU 1235 can further include one or more programmable execution units capable of executing shader programs.

The graphics subsystem 1230 periodically outputs pixel data for an image from the graphics memory 1240 to be displayed on the display device 1250. The display device 1250 can be any device capable of displaying visual information in response to a signal from the computer system 1200, including CRT, LCD, plasma, and OLED displays. The computer system 1200 can provide the display device 1250 with an analog or digital signal.

In accordance with various embodiments, the CPU 1205 is one or more general-purpose microprocessors having one or more processing cores. Further embodiments can be implemented using one or more CPUs 1205 with microprocessor architectures specifically adapted for highly parallel and computationally intensive applications, such as media and interactive entertainment applications.

The components of a system may be connected via a network, which may be any combination of the following: the Internet, an IP network, an intranet, a wide-area network ("WAN"), a local-area network ("LAN"), a virtual private network ("VPN"), the Public Switched Telephone Network ("PSTN"), or any other type of network supporting data communication between devices described herein, in different embodiments. A network may include both wired and wireless connections, including optical links. Many other examples are possible and apparent to those skilled in the art in light of this disclosure. In the discussion herein, a network may or may not be noted specifically.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable mediums for storing information. The term "computer-readable medium" includes, but is not limited to, portable or fixed storage devices, optical storage devices, wireless channels, a sim card, other smart cards, and various other mediums capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain. "About" includes within a tolerance of ±0.01%, ±0.1%, ±1%, ±2%, ±3%, ±4%, ±5%, ±8%, ±10%, ±15%, ±20%, ±25%, or as otherwise known in the art. "Substantially" refers to more than 76%, 135%, 90%, 100%, 105%, 109%, 109.9% or, depending on the context within which the term substantially appears, value otherwise as known in the art.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method for presenting application variations on a user interface, the method implemented on a computer device and comprising:
   associating computer applications with an application group, the computer applications being different variations of a same computer program;
   generating a user interface (UI) element that represents the application group based on computer programs available on the computer device and on a user identifier of a user of the computer device;

selecting a first computer application of the computer applications to indicate in association with the UI element; and presenting the UI element on a user interface, the UI element indicating the application group and the first computer application, the UI element configured to, upon selection via the user interface, launch the first computer application or launch a page about the application group, wherein the UI element includes content that represents the application group, wherein the UI element further includes a first indicator that represents first metadata associated with the first computer application selected from a first tier of attributes, and a second indicator that represents second metadata associated with the first computer application selected from a second tier of attributes, wherein the first tier of attributes and the second tier of attributes are different, wherein the content is included in the UI element independently of the selecting of the first computer application, and wherein the first indicator changes to represent third metadata associated with a second computer application of the computer applications upon a selection of the second computer application of the computer applications, the third metadata selected from the first tier of attributes.

2. The method of claim 1, wherein the first computer application is selected based on a first set of selection factors and prior to a user interaction on the computer device with the second computer application of the computer applications.

3. The method of claim 2, further comprising:
receiving the user interaction;
selecting, after the user interaction, the second computer application based on a second set of selection factors; and
updating a presentation of the UI element to the second computer application instead of the first computer application.

4. The method of claim 3, wherein the first set of selection factors is different from the second set of selection factors, and wherein the second set of selection factors relates to the user interaction.

5. The method of claim 3, wherein the first set of selection factors comprises at least one of: a first priority of an executable variation of the same computer program in association with a user identifier over a non-executable variation of the same computer program in association with the user identifier, a second priority of a backward compatible variation of the same computer program over a non-backward compatible variation of the same computer program, a third priority of an installed variation of the same computer program over a non-installed variation of the same computer program, a fourth priority of a compatible variation of the same computer program with a computer device generation over another compatible variation of the same computer program with a previous computer device generation, a fifth priority of a full version of the same computer program over a beta version of the same computer program and over a demo version of the same computer program, or a sixth priority of a regional variation of the same computer program for a region associated with the user identifier over another variation of the same computer program for a different region.

6. The method of claim 1, wherein the UI element includes a sortable attribute about the first computer application and a package attribute about at least one of: a release version of the first computer application or a compatible version of the computer device to run the first computer application.

7. The method of claim 6, wherein the sortable attribute includes at least one of: a last execution date of the first computer application on the computer device, an availability date of when the first computer application became available on the computer device to a user identifier, or a length of time the first computer application was executed in association with the user identifier.

8. The method of claim 1, wherein the same computer program is a video game title, wherein the computer applications are video game variations, and wherein the UI element is presented as an icon in a library that shows multiple icons corresponding to multiple video game titles.

9. The method of claim 8, wherein the icon includes content that represents the video game title, and wherein the icon further includes an indicator that identifies at least one of: a variation of the first computer application, an access status of a user of the computer device for the first computer application, a storage status of the first computer application on the computer device, a download status of the first computer application, or a sortable attribute of the first computer application.

10. The method of claim 1, wherein the UI element is presented in a presentation state that is one of at least: a non-focused presentation state or a focused presentation state, wherein the UI element includes data about the first computer application upon presentation in the non-focused presentation state, and wherein the UI element includes the data and additional data about the first computer application upon presentation in the focused presentation state.

11. The method of claim 10, wherein the UI element further includes content that remains the same in the non-focused presentation state and in the focused presentation state.

12. The method of claim 10, further comprising:
storing associations between indicators of the first computer application and the presentation state, wherein the associations change between the non-focused presentation state and the focused presentation state, and wherein the data includes one of the indicators and the additional data includes a different one of the indicators.

13. The method of claim 1, wherein the UI element is presented in a presentation state that is one of at least: a non-focused presentation state or a focused presentation state, wherein the UI element includes the first indicator in the non-focused presentation state, and wherein the UI element includes the first indicator and the second indicator in the focused presentation state.

14. A computer device comprising:
one or more processors; and
one or more memories storing computer-readable instructions that, upon execution by the one or more processors, configure the computer device to:
associate computer applications with an application group, the computer applications being different variations of a same computer program;
generate a user interface (UI) element that represents the application group based on computer programs available on the computer device and on a user identifier of a user of the computer device;
select a first computer application of the computer applications to indicate in association with the UI element; and present the UI element on a user interface, the UI element indicating the application group and the first computer application, the UI element configured to, upon being selected on the user interface, launch the first computer application or launch a page about the application group, wherein the UI element includes content that represents the application group, wherein the UI element further includes a first indicator that represents first metadata associated with the first computer application selected from a first tier of attributes, and a second indicator that represents second metadata associated with the first computer application selected from a second tier of attributes, wherein the first tier of attributes and the second tier of attributes are different, wherein the content is included in the UI element independently of the selection of the first computer application, and wherein the first indicator changes to represent third metadata associated with a second computer application of the computer applications upon a selection of the second computer application of the computer applications, the third metadata selected from the first tier of attributes.

15. The computer device of claim 14, wherein the first computer application is selected based on a first set of selection factors and prior to a user interaction on the computer device with the second computer application of the computer applications.

16. The computer device of claim 15, wherein the execution of the computer-readable instructions further configure the computer device to:
receive the user interaction;
select, after the user interaction, the second computer application based on a second set of selection factors; and
update a presentation of the UI element to the second computer application instead of the first computer application, wherein the first set of selection factors is different from the second set of selection factors, and wherein the second set of selection factors relate to the user interaction.

17. The computer device of claim 14, wherein the UI element is presented in a presentation state that is one of at least: a non-focused presentation state or a focused presentation state, wherein the UI element includes the first indicator in the non-focused presentation state, and wherein the UI element includes the first indicator and the second indicator in the focused presentation state.

18. A non-transitory computer-readable storage medium storing computer-readable instructions that, upon execution on a computer device, cause the computer device to perform operations comprising:

associating computer applications with an application group, the computer applications being different variations of a same computer program;
generating a user interface (UI) element that represents the application group based on computer programs available on the computer device and on a user identifier of a user of the computer device;
selecting a first computer application of the computer applications to indicate in association with the UI element; and
presenting the UI element on a user interface, the UI element indicating the application group and the first computer application, the UI element configured to, upon being selected on the user interface, launch the first computer application or launch a page about the application group, wherein the UI element includes content that represents the application group, wherein the UI element further includes a first indicator that represents first metadata associated with the first computer application selected from a first tier of attributes, and a second indicator that represents second metadata associated with the first computer application selected from a second tier of attributes, wherein the first tier of attributes and the second tier of attributes are different, wherein the content is included in the UI element independently of the selecting of the first computer application, and wherein the first indicator changes to represent third metadata associated with a second computer application of the computer applications upon a selection of the second computer application of the computer applications, the third metadata selected from the first tier of attributes.

19. The non-transitory computer-readable storage medium of claim 18, wherein the UI element includes content that represents the application group, and wherein the UI element further includes an indicator that identifies at least one of: a variation of the first computer application, an access status of a user of the computer device for the first computer application, a storage status of the first computer application on the computer device, a download status of the first computer application, or a sortable attribute of the first computer application.

20. The non-transitory computer-readable storage medium of claim 18, wherein the UI element is presented in a presentation state that is one of at least: a non-focused presentation state or a focused presentation state, wherein the UI element includes the first indicator in the non-focused presentation state, and wherein the UI element includes the first indicator and the second indicator in the focused presentation state.

* * * * *